United States Patent
Asakura

(10) Patent No.: US 12,532,366 B2
(45) Date of Patent: Jan. 20, 2026

(54) NON-TRANSITORY COMPUTER-READABLE RECORDING MEDIUM STORING COMPUTER-READABLE INSTRUCTIONS FOR COMMUNICATION DEVICE, COMMUNICATION DEVICE, AND METHOD PERFORMED BY COMMUNICATION DEVICE

(71) Applicant: BROTHER KOGYO KABUSHIKI KAISHA, Nagoya (JP)

(72) Inventor: Hirotaka Asakura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 276 days.

(21) Appl. No.: 18/341,033

(22) Filed: Jun. 26, 2023

(65) Prior Publication Data
US 2023/0422324 A1 Dec. 28, 2023

(30) Foreign Application Priority Data
Jun. 28, 2022 (JP) .................... 2022-103997

(51) Int. Cl.
*H04W 76/14* (2018.01)
*H04W 84/12* (2009.01)

(52) U.S. Cl.
CPC ............ *H04W 76/14* (2018.02); *H04W 84/12* (2013.01)

(58) Field of Classification Search
CPC ..... H04W 76/14; H04W 84/12; H04W 12/04; G06F 9/4401
USPC ........................ 370/338, 252, 254
See application file for complete search history.

(56) References Cited

U.S. PATENT DOCUMENTS

| | | | |
|---|---|---|---|
| 2017/0230537 A1* | 8/2017 | Kawanishi | H04N 1/00307 |
| 2019/0147309 A1* | 5/2019 | Hirano | H04W 8/005 726/5 |
| 2019/0306919 A1 | 10/2019 | Miyake | |
| 2020/0146101 A1* | 5/2020 | Tsuboi | H04W 56/0045 |
| 2022/0183106 A1 | 6/2022 | Miyake | |

FOREIGN PATENT DOCUMENTS

| | | | | |
|---|---|---|---|---|
| JP | 2019180042 A | | 10/2019 | |
| WO | WO-2022051917 A1 | * | 3/2022 | ............ H04W 24/02 |

OTHER PUBLICATIONS

Wi-Fi Easy Connect Specification Version 2.0, Wi-Fi Alliance, 2020.
Wi-Fi Direct Specification Version 1.9, Wi-Fi Alliance, 2021.

* cited by examiner

*Primary Examiner* — Huy D Vu
(74) *Attorney, Agent, or Firm* — Scully, Scott, Murphy & Presser, P.C.

(57) ABSTRACT

A first communication device may: cause a display unit to display first method selection information including M obtaining methods for obtaining a bootstrapping key of a different communication device different from the first communication device; in a case where a specific obtaining method is selected from among the M obtaining methods included in the first method selection information, cause the display unit to display specific support information; obtain a specific bootstrapping key by the specific obtaining method; send an authentication request; receive an authentication response; and execute communication of connection information.

15 Claims, 14 Drawing Sheets

| Printer | Model Name | Setup Information Outputting Method |
|---|---|---|
| Printer 10A | MNA | Display QR Code |
| Printer 10B | MNB | QR Code Adhered |
| Printer 10C | MNC | BT (ADV_EXT) |
| Printer 10D | MND | BT (GATT) |
| Printer 10E | MNE | BT (GATT) |
| Printer 10F | MNF | NFC (Direct Communication) |
| Printer 10G | MNG | NFC Handover |

# NON-TRANSITORY COMPUTER-READABLE RECORDING MEDIUM STORING COMPUTER-READABLE INSTRUCTIONS FOR COMMUNICATION DEVICE, COMMUNICATION DEVICE, AND METHOD PERFORMED BY COMMUNICATION DEVICE

REFERENCE TO RELATED APPLICATIONS

This application claims priority from Japanese Patent Application No. 2022-103997 filed on Jun. 28, 2022. The entire content of the priority application is incorporated herein by reference.

BACKGROUND ART

A technique of establishing Wi-Fi connection between a pair of devices according to Device Provisioning Protocol (DPP) is known. In particular, a technique in which the devices obtain a public key of a printer by using one of QR Code (QR Code is a registered trademark of DENSO WAVE INCORPORATED), Near Field Communication (NFC), and Bluetooth communication (Bluetooth is a registered trademark of Bluetooth SIG) is known.

The present teachings provide an art configured to appropriately establish Wi-Fi connection between a communication device and an external device.

DESCRIPTION

A non-transitory computer-readable recording medium storing computer-readable instructions for a first communication device is disclosed herein. The first communication device may comprise: a Wi-Fi interface configured to execute Wi-Fi communication in conformity with a Wi-Fi standard; a display unit; and a processor. The computer-readable instructions, when executed by the processor, may cause the first communication device to: cause the display unit to display first method selection information including M obtaining methods for obtaining a bootstrapping key of a different communication device different from the first communication device, M being an integer of equal to or greater than 2; in a case where a specific obtaining method is selected from among the M obtaining methods included in the first method selection information, cause the display unit to display specific support information corresponding to the specific obtaining method among M support information corresponding to the M obtaining methods, each of the M support information being for supporting obtaining of the bootstrapping key of the different communication device by a corresponding obtaining method corresponding to the support information; after the specific obtaining method has been selected, obtain by the specific obtaining method a specific bootstrapping key which is a bootstrapping key of a second communication device different from the first communication device; in a case where the specific bootstrapping key is obtained, send an authentication request in which the specific bootstrapping key is used to the second communication device via the Wi-Fi interface; in a case where the authentication request is sent to the second communication device, receive an authentication response from the second communication device via the Wi-Fi interface; and in a case where the authentication response is received from the second communication device, execute communication of connection information with the second communication device via the Wi-Fi interface, the connection information being for establishing a Wi-Fi connection between the first communication device or the second communication device and an external device.

According to the above configuration, the first communication device displays the first method selection information which indicates the M obtaining methods for obtaining the bootstrapping key and displays the specific support information corresponding to the selected specific obtaining method. As a result of this, the specific bootstrapping key is obtained by way of the specific obtaining method, and various communication such as sending of an authentication request is executed. As a result of this, Wi-Fi connection can be appropriately established between the communication device and the external device.

The first communication device itself realized by the computer-readable instructions, and a method performed by the first communication device are also novel and useful.

OUTLINE OF COMMUNICATION SYSTEM 2; FIG. 1

Figure 1:
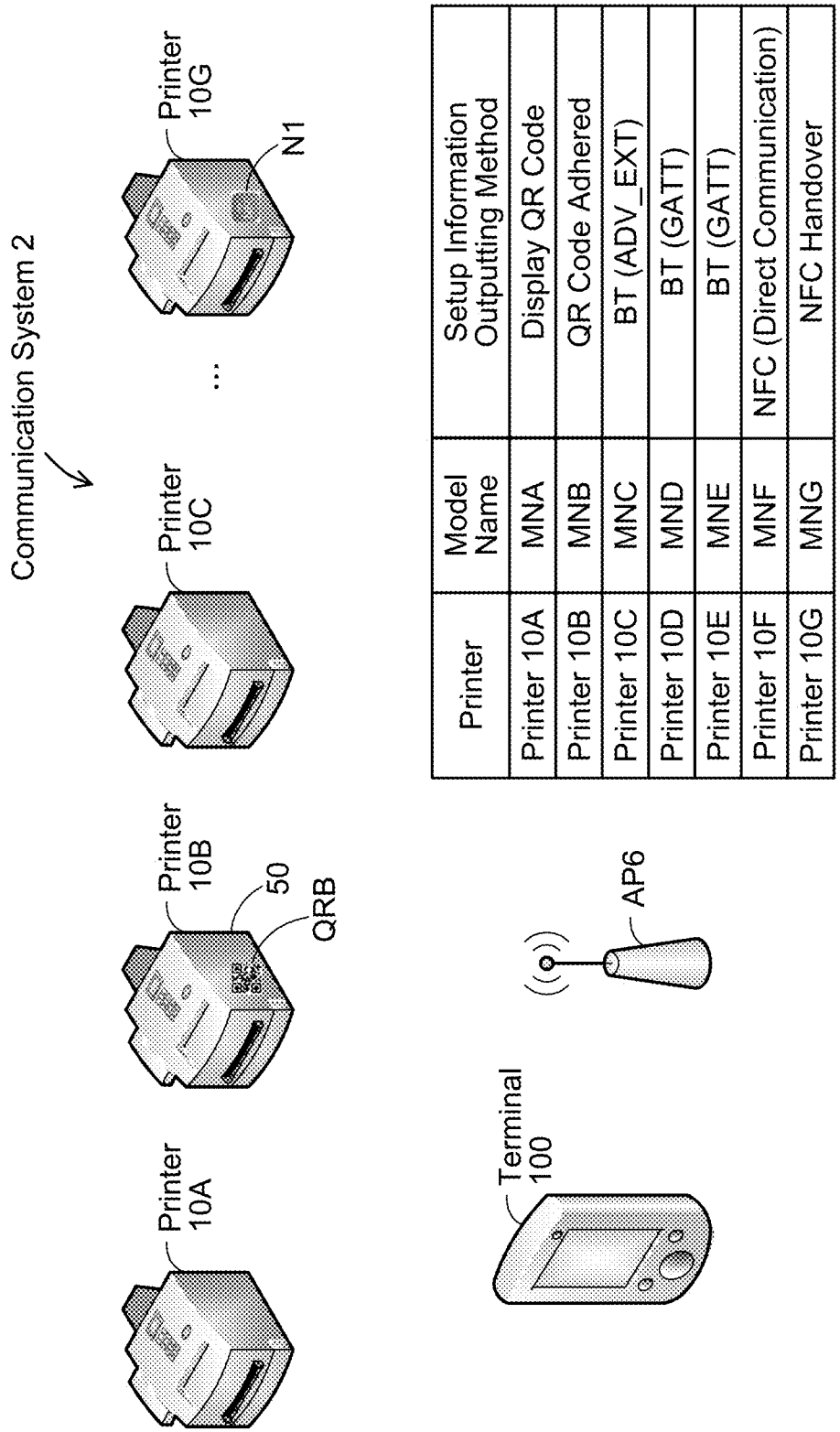
FIG. 1 illustrates an outline of a communication system and characteristics of printers.

As shown in FIG. 1, a communication system 2 comprises an access point (AP) 6, a plurality of printers the 10A to 10G, and a terminal 100. Hereafter, the printers 10A to 10G may be simply referred to as "printers 10" when they do not need to be distinguished from each other. In the present embodiment, a situation where wireless connection conforming to a Wi-Fi standard (hereafter "Wi-Fi connection") is established by using the terminal 100 between each printer 10A to 10G and the AP 6 is assumed.

(Characteristics of Printers)

Characteristics of the printers 10A to 10G will be described. A table at bottom right on FIG. 1 indicates setup information outputting methods of the respective printers 10A to 10G. The setup information outputting methods are methods for outputting setup information, and the setup information is information used when establishing Wi-Fi connection between each printer 10 and the AP 6. The setup information includes public keys of the printers 10.

The printer 10A can output the setup information by displaying a QR Code obtained by coding the setup information. In addition, the printer 10B comprises a housing 50 (see FIG. 1) on which a QR Code QRB obtained by coding the setup information is affixed.

Each of the printers 10C to 10E can output the setup information by using wireless communication conforming to a Bluetooth standard. Hereafter, Bluetooth will be referred to as "BT" and wireless communication conforming to the BT standard will be referred to as "BT communication". The BT standard may comprise, for example, a standard of IEEE802.15.1 and its subordinate standards. More specifically, each of the printers 10C to 10E supports Bluetooth Low Energy (BLE). BLE is realized by a version 4.0 or newer of the BT standard. In particular, the printer 10C sends the setup information to the terminal 100 by using an Advertise signal. Each of the printers 10D and 10E sends the setup information to the terminal 100 by using one-to-one connection according to BT (e.g., Generic Attribute Profile (GATT)).

Each of the printers 10F and 10G can output the setup information by using communication conforming to Near Field Communication (NFC) scheme (hereafter, "NFC communication"). The NFC scheme is a wireless communication scheme based on international standard ISO/IEC21481 or 18092, for example. The printer 10F directly sends the setup information to the terminal 100 by using the NFC communication. The printer 10G sends information for establishing Wi-Fi connection with the printer to the terminal 100 by using the NFC communication and thus sends the setup information to the terminal 100 by using the established Wi-Fi connection. As such, communication of target data between a pair of devices in which the NFC communication is used to communicate information for establishing Wi-Fi connection and thereafter the Wi-Fi connection is used to communicate the target data may be referred to as "NFC handover".

Figure 2:
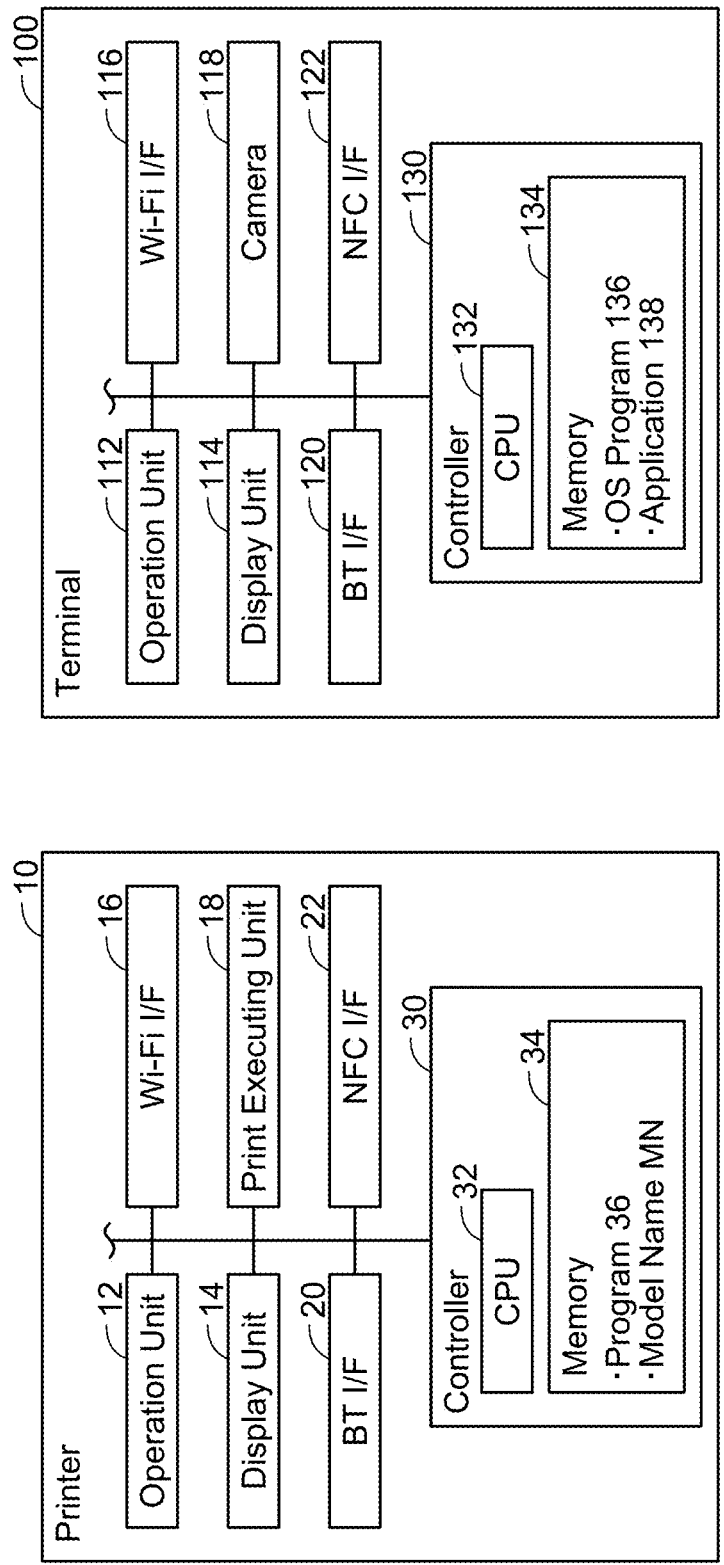
FIG. 2 illustrates control configurations of devices.

(Control Configuration of Devices; FIG. 2)

Subsequently, with reference to FIG. 2, control configurations of each printer 10 (i.e., printers 10A to 10G) and the terminal 100 will be described.

(Configuration of Printer 10)

Each of the printers 10 is a peripheral device configured to execute a print function (e.g., peripheral device of the terminal 100). In a modification, the printer 10 may be a multi-function peripheral configured to execute a scan function, facsimile function, for example. The printer 10 comprises an operation unit 12, a Wi-Fi interface 16, and a print executing unit 18. Hereafter, an interface will be referred to as "I/F". The operation unit 12 comprises a plurality of keys. A user can input various instructions into the printer 10 by operating the operation unit 12. The print executing unit 18 comprises a printing mechanism with inkjet scheme or laser scheme.

The Wi-Fi I/F 16 is a wireless I/F for executing Wi-Fi communication conforming to a Wi-Fi standard. The Wi-Fi standard may comprise a wireless communication standard for executing wireless communication according to standards of 802.11 by the Institute of Electrical and Electronics Engineers, Inc. (IEEE) and its subordinate standards (e.g., 802.11a, 11b, 11g, 11n, 11ac). In particular, the Wi-Fi I/F 16 supports Device Provisioning Protocol (DPP) formulated by Wi-Fi Alliance. Details of the DPP are written in "Wi-Fi Easy Connect (trademark) Specification Version 2.0" created by Wi-Fi Alliance.

The Wi-Fi I/F 16 of the printer 10G further supports Wi-Fi Direct (WFD) (Wi-Fi Direct is a registered trademark of Wi-Fi Alliance) formulated by Wi-Fi Alliance. Reasons for that supporting will be described later. Details of WFD are written in "Wi-Fi Direct Specification Version1.9" created by Wi-Fi Alliance. Hereafter, Wi-Fi connection established according to WFD will be referred to as "WFD connection". The Wi-Fi I/F 16 of each of the other printers 10A to 10F may or may not support WFD.

Further, the printer 10A comprises a display unit 14. The display unit 14 is a display for displaying various types of information. The display unit 14 is a so-called touch screen, and also functions as an operation unit 12. In the present embodiment, QR Code is displayed on the display unit 14. Here, each of the other printers 10B to 10G may or may not comprise the display unit 14.

Further, each of the printers 10C to 10E comprises a BT I/F 20. The BT I/F 20 is an I/F for executing BT communication. Here, each of the other printers 10A, 10B and 10F, 10G may or may not comprise the BT I/F 20.

Further, each of the printers 10F, 10G comprises an NFC I/F 22. The NFC I/F 22 is an I/F for executing NFC communication. Here, each of the other printers 10A to 10E may or may not comprise the NFC I/F 22.

Differences between Wi-Fi communication, BT communication, and NFC communication will be described. In regards to communication speed of each communication, Wi-Fi communication (e.g., highest communication speed is 600 Mbps), BT communication (e.g., highest communication speed is 24 Mbps), and NFC communication (e.g., highest communication speed is 424 kbps) are in descending order. In regards of frequency of carrier wave (carrier frequency) for each communication, carrier frequency for Wi-Fi communication is 2.4 GHz band or 5.0 GHz band, carrier frequency for BT communication is 2.4 GHz band, and carrier frequency for NFC communication is 13.56 MHz. That is, the carrier waves of the respective communications vary from each other when 5.0 GHz band is implemented as the carrier wave for Wi-Fi communication. In regards to a distance with which each communication can be executed, a longest distance for executing Wi-Fi communication (e.g., 100 m), a longest distance for executing BT communication (e.g., approximately several dozen meters), and a longest distance for executing NFC communication (e.g., approximately ten cm) are in descending order.

A controller 30 comprises a CPU 32 and a memory 34. The CPU 32 is configured to execute various processes in accordance with a program 36 stored in the memory 34. The memory 34 is constituted of a volatile memory, a non-volatile memory, for example. The memory 34 further stores a model name MN of itself. Here, the model name MN indicates a model name when the printers 10A to 10G are not distinguished from each other, and as shown in FIG. 1, the printer stores a model name MNA and the printer 10B stores a model name MNB. The same applies to the other printers.

(Configuration of Terminal 100)

The terminal 100 is a terminal device such as a mobile phone (e.g., smartphone), PDA, a tablet PC. In a modification, the terminal 100 may be a stationary PC, a laptop PC, for example. The terminal 100 comprises an operation unit 112, a display unit 114, a Wi-Fi I/F 116, a camera 118, a BT I/F 120, an NFC I/F 122, and a controller 130. Each unit 112-130 is connected to a bus line (reference number omitted).

The operation unit 112 is an I/F for inputting various instructions into the terminal 100. The display unit 114 is a display for displaying various types of information. The display unit 114 is a so-called touch screen, and also functions as an operation unit 112. The camera 118 is a device for capturing object(s). In the present embodiment, the camera 118 is used for capturing the QR Code on the printer 10. The Wi-Fi I/F 116 supports DPP and WFD. The BT I/F 120, the NFC I/F 122 are respectively the same as the BT I/F 20, the NFC I/F 22 of the printer 10.

The controller 130 comprises a CPU 132 and a memory 134. The CPU 132 is configured to execute various processes in accordance with programs 136, 138 stored in the memory 134. The memory 134 is constituted of a volatile memory, a non-volatile memory, for example.

The operating system (OS) program 136 is a program for realizing basic operations of the terminal 100. The application 138 is a program for establishing Wi-Fi connection between the terminal 100 and the AP 6, and/or establishing Wi-Fi connection between the printer 10 and the AP 6. Hereafter, the OS program and the application will be respectively referred to as "OS" and "app". The app 138 is, for example, installed on the terminal 100 from a server (not illustrated) on the Internet provided by a vendor of the printer 10, or from a server (not illustrated) on the Internet provided by a vendor of the OS 136.

The app 138 is configured to cause, by supplying instructions to the OS 136, the OS 136 to execute various processes and/or cause another application to execute various processes via the OS 136. Accordingly, each of the processes executed by the OS 136 or the other application in accordance with the instructions from the app 138 as well may be called a process realized by the app 138 (i.e., the CPU 132 is operated as an executing unit that executes the instructed process).

Figure 3:
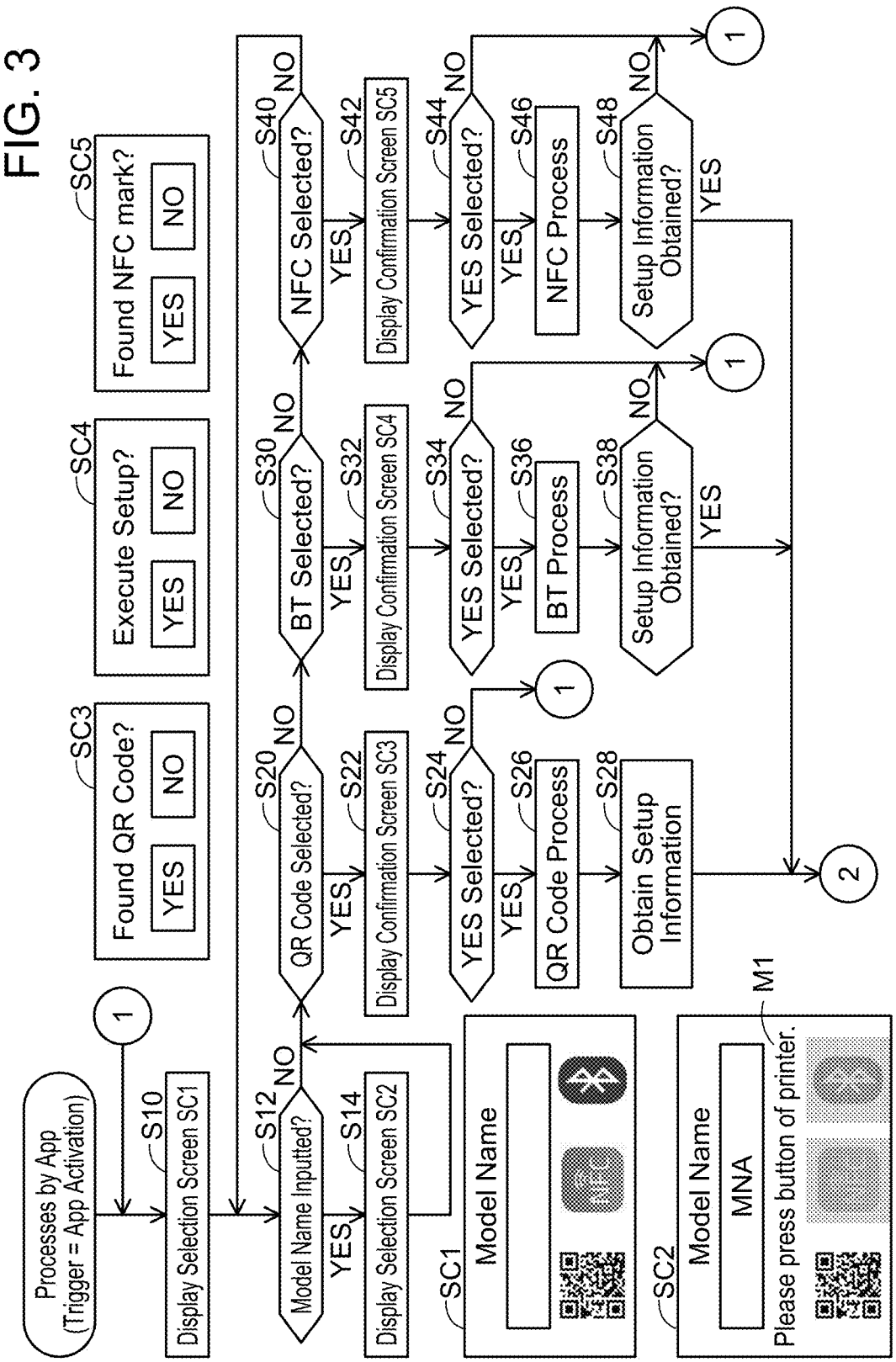
FIG. 3 illustrates a flowchart of processes executed by an application.
Figure 4:
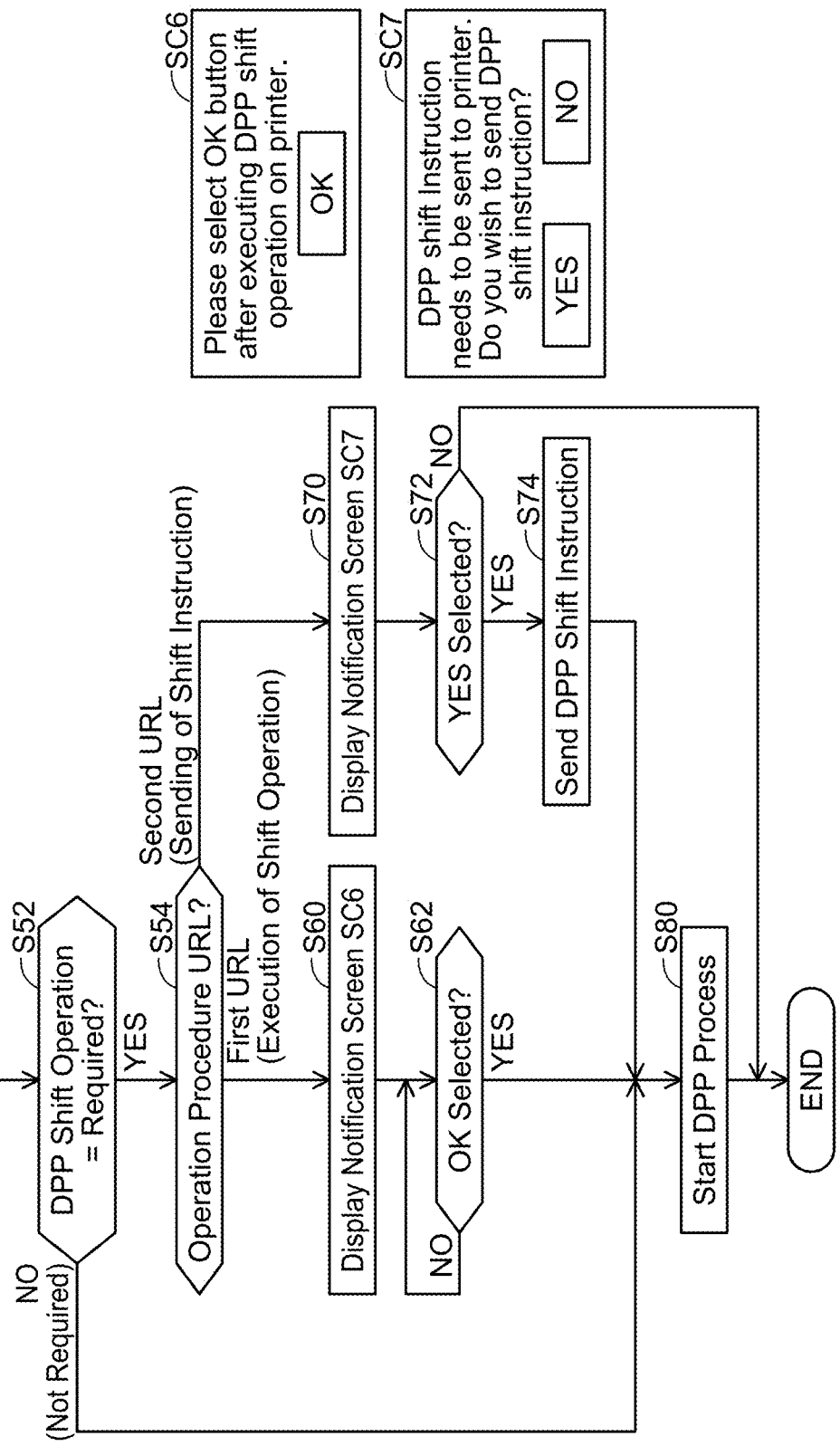
FIG. 4 illustrates a flowchart continued from FIG. 3.

(Process of App.; FIGS. 3 and 4)

Subsequently, with reference to FIGS. 3 and 4, processes realized by the CPU 132 of the terminal 100 executing the app 138 will be described. FIGS. 3 and 4 illustrate processes for establishing Wi-Fi connection between the printer 10 and the AP 6 according to DPP. Hereafter, a printer with which Wi-Fi connection is to be established will be referred to as "target printer". Also, hereafter, when the processes of FIGS. 3 and 4 are described, the app 138 will be described as a subject of action, instead of the CPU 132. The process of FIG. 3 is started with activation of the app 138 as a trigger.

The app 138 causes a selection screen SC1 to be displayed on the display unit 114 in S10. The selection screen SC1 includes a model name inputting section for inputting a model name and three marks indicating three setup information obtaining methods (i.e., QR Code, BT, NFC). The mark indicating QR Code means to obtain the setup information by capturing the QR Code displayed on the target printer or the QR Code affixed on the target printer. The mark indicating BT means to obtain the setup information by executing BT communication with the target printer. The mark indicating NFC means to obtain the setup information by executing NFC communication with the target printer.

The app 138 determines whether or not a model name has been inputted into the model name inputting section in the selection screen SC1 in S12. The app 138 determines YES in S12 when the model name is inputted and proceeds to S14, whereas the app 138 determines NO in S12 when the model name is not inputted and proceeds to S20.

The app 138 causes a selection screen SC2 to be displayed on the display unit 114 in S14. In the selection screen SC2, the model name as inputted into the model name inputting section is written. The selection screen SC2 further includes a message M1 indicating an operation the user should perform to shift a state of the target printer (i.e., printer identified by the inputted model name) from a DPP non-respondent state to a DPP respondent state. The DPP non-respondent state is a state incapable of sending an Authentication Response according to an Authentication Request of the DPP. Hereafter, Authentication will be referred to as "Auth", and Request, Response will be referred to as "Req", "Res", respectively.

The operation for shifting the state of the printer 10 from the DPP non-respondent state to the DPP respondent state varies according to which model of the printer 10. The app 138 has, for each of the plural model names, the model name and the operation for shifting the state of the printer 10 with that model name to the DPP respondent state stored in association with each other. When a model name is inputted into the selection screen SC1, the app 138 specifies the operation associated with the model name and causes the selection screen SC2 including the message M1 indicating the operation to be displayed on the display unit 114. Thus, the user can identify the operation for shifting the printer 10 to the DPP respondent state.

In the selection screen SC2, only one of the three marks indicating the three setup information obtaining methods is displayed in a selectable manner, meaning that the only one mark can be selected from among the three marks. The setup information obtaining method varies according to which model of the printer 10. The app 138 has, for each of the plural model names, the model name and the setup information obtaining method complying with the printer 10 with that model name stored in association with each other. When a model name is inputted into the selection screen SC1, the app 138 specifies one or more setup information obtaining methods associated with the inputted model name and causes the selection screen SC2 having a selectable manner by which only these one or more setup information obtaining methods can be selected to be displayed on the display unit 114. In other words, the app 138 causes the selection screen SC2 having an unselectable manner (e.g., with shading) by which setup information obtaining method(s) not associated with the inputted model name cannot be selected to be displayed on the display unit 114. Due to this, the user can easily identify the one or more setup information obtaining methods which correspond to the target printer. Here, when there are two or more setup information obtaining methods associated with the inputted model name, the app 138 may display the selection screen SC2 having a selectable manner by which only one of the two or more setup information obtaining methods can be selected. For example, the app 138 may have a priority for showing to the user of the three setup information obtaining methods stored therein, and may cause the selection screen SC2 having the selectable manner by which the one with the highest priority of the two or more setup information obtaining methods can be selected to be displayed on the display unit 114.

The app 138 determines whether the mark indicating QR Code has been selected on the selection screen SC1 or SC2 or not in S20. The process proceeds to S22 when the mark indicating QR Code is selected (YES in S20).

The app 138 causes a confirmation screen SC3 to be displayed on the display unit 114 in S22. The confirmation screen SC3 includes a message inquiring the user whether QR Code has been found on the target printer or not and YES and NO buttons. For example, the user may not be able to find the QR Code when the target printer is not displaying the QR Code. By seeing the confirmation screen SC3, the user can acknowledge that he/she should find the QR Code in order to perform the setup.

In S24, the app 138 determines whether the YES button has been selected on the confirmation screen SC3 or not. The app 138 proceeds to S26 when the YES button is selected (YES in S24), whereas the app 138 returns to S10 when the NO button is selected (NO in S24).

The app 138 executes a QR Code process in S26. The QR Code process includes displaying of a screen prompting to capture QR Code.

The app 138 obtains the setup information in S28. Specifically, the app 138 decodes the QR Code captured by the camera 118 and obtains the setup information.

In S30, the app 138 determines whether the mark indicating BT has been selected on the selection screen SC1 or SC2 or not. The process proceeds to S32 when the mark indicating BT is selected (YES in S30).

In S32, the app 138 causes a confirmation screen SC4 to be displayed on the display unit 114. The confirmation screen SC4 includes a message inquiring the user whether to execute the setup (i.e., connecting the target printer to the AP 6) and YES and NO buttons. Due to this, the user can cause the setup to be executed by selecting the YES button when the user wishes to execute the setup.

In S34, the app 138 determines whether or not the YES button has been selected on the confirmation screen SC4 or not. The app 138 proceeds to S36 when the YES button is selected (YES in S34) whereas the app 138 returns to S10 when the NO button is selected (NO in S34).

The app 138 executes a BT process in S36. The BT process includes BT communication for obtaining the setup information.

In S38, the app 138 determines whether the setup information has been obtained or not. The app 138 proceeds to processes of FIG. 4 when the setup information is obtained (YES in S38) whereas the app 138 returns to S10 when the setup information is not obtained (NO in S38).

The app 138 determines whether the mark indicating NFC has been selected on the selection screen SC1 or SC2 or not in S40. The process proceeds to S42 when the mark indicating NFC is selected (YES in S40).

In S42, the app 138 causes a confirmation screen SC5 to be displayed on the display unit 114. The confirmation screen SC5 includes a message inquiring the user whether an NFC mark N1 (i.e., a spot to which the terminal 100 should be moved closer to establish NFC connection, see FIG. 1) has been found on the target printer or not and YES and NO buttons. For example, the user cannot find the NFC mark N1 when the target printer does not comprise an NFC I/F. The user can acknowledge that he/she should find the NFC mark N1 in order to execute the setup, by seeing the confirmation screen SC5.

In S44, the app 138 determines whether the YES button on the confirmation screen SC5 has been selected or not. The app 138 proceeds to S46 when the YES button is selected (YES in S44) whereas the app 138 returns to S10 when the NO button is selected (NO in S44).

The app 138 executes the NFC process in S46. Although details are to be described later, the NFC process includes NFC communication for obtaining the setup information.

In S48, the app 138 determines whether the setup information has been obtained or not. The app 138 proceeds to the processes of FIG. 4 when the setup information is obtained (YES in S48) whereas the app 138 returns to S10 when the setup information is not obtained (NO in S48).

(Continuation from FIG. 3; FIG. 4)

The app 138 determines whether a DPP shift operation is required or not in S52 of FIG. 4. The setup information obtained in S28, S38 or S48 in FIG. 3 includes DPP shift operation information indicating one of "Required" indicating that the DPP shift operation is required and "Not Required" indicating that the DPP shift operation is not required. The app 138 determines YES in S52 when the DPP shift operation information indicates "Required" and proceeds to S54 whereas the app 138 determines NO in S52 when the DPP shift operation information indicates "Not Required" and proceeds to S80. Here, when the DPP shift operation information indicates "Required", the setup information further includes a uniform resource locator (URL) of a webpage indicating a specific method for shifting to the DPP respondent state (hereafter will be referred to as "operational procedure URL"). In the present embodiment, the above-mentioned specific method comprises one of "execution of shifting operation" which is directly operating the target printer and "sending of shift instruction" which is sending a shift instruction from the terminal 100 to the target printer. Alternatively in a modification, the setup information may include a screen ID, instead of the operational procedure URL. The screen ID is information which identifies one of plural screens the app 138 has already stored therein. The screen ID included in the setup information may indicate one of a screen ID identifying a screen prompting the "execution of shift operation" and a screen ID identifying a screen prompting the "sending of shift instruction". That is, the information included in the DPP shift operation information when the DPP shift operation information indicates "Required" may not be limited to a URL, but simply needs to be information indicating a specific method for shifting to the DPP respondent state.

In S54, the app 138 determines whether the operational procedure URL is a first URL of a webpage indicating the "execution of shift operation" or a second URL of a webpage indicating the "sending of shift instruction". The app 138 proceeds to S60 when the operational procedure URL is the first URL whereas the app 138 proceeds to S70 when the operational procedure URL is the second URL.

In S60, the app 138 causes a notification screen SC6 which is downloaded from the first URL by accessing the first URL to be displayed on the display unit 114. The notification screen SC6 includes a message prompting to select an OK button after executing the DPP shift operation on the target printer and the OK button. Due to this, the user can acknowledge what operation the user should perform by seeing the notification screen SC6.

In S62, the app 138 monitors selection of the OK button in the notification screen SC6. The app 138 proceeds to S80 when the OK button is selected (YES in S62).

In S70, the app 138 causes a notification screen SC7 which is downloaded from the second URL by accessing the second URL to be displayed on the display unit 114. The notification screen SC7 includes a message inquiring the user whether to send the DPP shift instruction to the target printer or not and YES and NO buttons. Due to this, the user can acknowledge what operation the user should perform by seeing the notification screen SC7.

In S72, the app 138 determines whether the YES button in the notification screen SC7 has been selected or not in S72. The app 138 proceeds to S74 when the YES button is selected (YES in S72) whereas the app 138 ends the processes of FIG. 4 without executing processes of S74 and after when the NO button is selected (NO in S72).

The app 138 sends the DPP shift instruction to the target printer in S74. The DPP shift instruction is an instruction for shifting the state of the target printer from the DPP non-respondent state to the DPP respondent state. In this case, since the user does not need to directly operate the target printer, user convenience can be improved.

The app 138 starts a DPP process in S80. Specifically, the app 138 firstly sends an Auth Req in which the public key included in the obtained setup information is used to the target printer. As a result of this, communication such as Auth, Configuration (hereafter "Config") of DPP is executed between the terminal 100 and the target printer. When the DPP process succeeds, Wi-Fi connection is established between the target printer and the AP 6.

Figure 5:
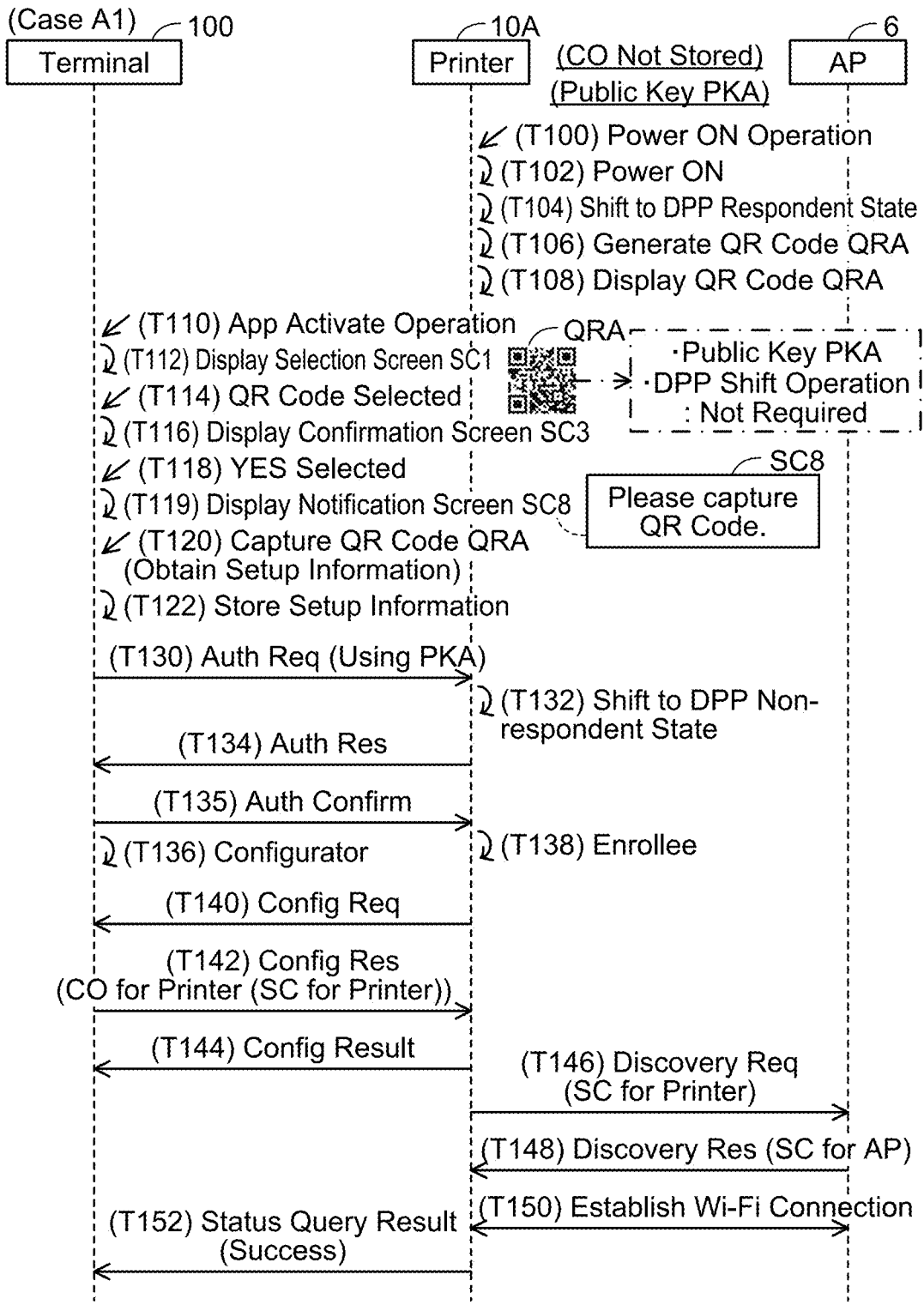
FIG. 5 illustrates a sequence diagram of Case A1.

(Case A1; FIG. 5)

Subsequently, with reference to FIGS. 5 to 14, a specific case realized by the processes of FIGS. 3 and 4 will be described. Firstly, with reference to FIG. 5, Case A1 will be described. Case A1 is a case where the DPP process is executed between the terminal 100 and the printer Under an initial state of FIG. 5, the printer 10A has a public key PKA and a private key (not illustrated) corresponding to the public key PKA stored therein. In Case A1, the printer 10A does not have Configuration Object (hereafter "CO") of DPP stored therein, and thus the printer 10A automatically shifts to the DPP respondent state when power is turned ON.

Although not illustrated, under the initial state of FIG. 5, the DPP process has been executed between the terminal 100 and the AP 6, and thereby Wi-Fi connection is already established (present) between the terminal 100 and the AP 6. For easier understanding, in descriptions in FIG. 5 and after, operations executed by the CPU of each device (e.g., CPU 32, 132) will be described with the respective device (e.g., the printer 10A, the terminal 100) as subject of action, without describing the CPU as subject of action. The same applies to descriptions of FIGS. 6 to 14. In particular, for operations executed by the app 138 of the terminal 100, the app 138 may be described as the subject of action, instead of describing the terminal 100 as the subject of action.

In T100 of FIG. 5, when an operation for turning on the power of the printer 10A is performed by the user, the power of the printer 10A is turned on in T102. In this case, the printer 10A automatically shifts from the DPP non-respondent state to the DPP respondent state in T104, generates a QR Code QRA in T106, and displays the QR Code QRA on the display unit 14 in T108. The QR Code QRA is a code image obtained by coding the setup information (i.e., the public key PKA and the DPP shift operation information "Not Required").

The terminal 100 accepts an operation for activating the app 138 from the user in T110. As a result of this, once the app 138 is activated (trigger for the processes of FIG. 3), the app 138 cause the selection screen SC1 to be displayed on the display unit 114 in T112 (S10 in FIG. 3).

When selection of the mark indicating QR Code in the selection screen SC1 is accepted from the user in T114 (YES in S20), the app 138 causes the confirmation screen SC3 to be displayed on the display unit 114 in T116 (S22). In the present case, since the QR Code QRA is displayed on the display unit 14 of the printer 10A (see T108), the app 138 accepts selection of the YES button in the confirmation screen SC3 from the user in T118 (YES in S24). In this case, the app 138 causes a notification screen SC8 to be displayed on the display unit 114 in T119. The notification screen SC8 includes a message prompting to capture a QR Code. Due to this, the user can acknowledge that he/she should capture the QR Code.

After the app 138 accepts an operation for activating the camera 118 from the user who saw the notification screen SC8, the app 138 accepts an operation with the camera 118 capturing the QR Code QRA displayed on the printer 10A (S26) in T120. In this case, the app 138 obtains the setup information by decoding the captured QR Code QRA (S28), and stores the obtained setup information in the memory 134 in T122. The process of T120 corresponds to Bootstrapping of DPP.

When the setup information is obtained in T120, because the DPP shift operation information included in the setup information indicates "Not Required" (NO in S52 in FIG. 4), in T130 the app 138 sends an Auth Req in which the public key PKA is used to the printer 10A via the Wi-Fi OF 116 (S80).

The Auth Req is a signal for requesting authentication of the terminal 100, the sender, to be executed. Specifically, the terminal 100 firstly generates a shared key by using the private key (not illustrated) of the terminal 100 and the public key PKA of the printer 10A and encrypts a random value by using the shared key to generate encrypted data. Then the terminal 100 sends the Auth Req including the public key (not illustrated) of the terminal 100, the encrypted data, and Capability of the terminal 100 to the printer 10A. The Capability of the terminal 100 includes a value indicating that it is capable of only operating as Configurator of DPP.

When the Auth Req is received from the terminal 100 via the Wi-Fi OF 16 in T130, the printer 10A authenticates the encrypted data included in the Auth Req. Specifically, the printer generates a shared key by using the public key of the terminal 100 included in the Auth Req and the private key of the printer 10A and decrypts the encrypted data by using the shared key. When the encrypted data is successfully decrypted, the printer 10A determines that the authentication has succeeded, and executes processes from T132.

The printer 10A shifts from the DPP respondent state to the DPP non-respondent state in T132. As the authentication of the encrypted data has succeeded, the DPP respondent state does not need to be maintained. The DPP respondent state is a state in which the printer 10A is under higher processing load than in the DPP non-respondent state. The printer 10A can reduce the processing load by shifting from the DPP respondent state to the DPP non-respondent state.

The printer 10A sends an Auth Res including Capability of the printer 10A to the terminal 100 via the Wi-Fi OF 16 in T134. The Capability of the printer 10A includes a value indicating that it is capable of only operating as Enrollee of DPP.

When the Auth Res is received from the printer 10A in T134, the terminal 100 determines that the Capability of the printer 10A (i.e., Enrollee) included in the Auth Res and the Capability of the terminal 100 itself (i.e., Configurator) do not conflict each other. The terminal 100 then sends Auth Confirm to the AP 6 via the Wi-Fi OF 116 in T135. The Auth Confirm includes information indicating that the terminal 100 operates as Configurator and the printer 10A operates as Enrollee. As a result of this, the terminal 100 determines that the terminal 100 is to operate as Configurator in T136. The Configurator is a device which takes a role of sending CO to Enrollee.

Further, in T138, the printer 10A determines that the printer 10A is to operate as Enrollee. The Enrollee is a device which takes a role of receiving CO from Configurator. The processes of T130 and T134 to T138 correspond to Auth of DPP.

The printer 10A sends Config Req to the terminal 100 via the Wi-Fi OF 16 in T140. The Config Req is a signal for requesting CO to be sent.

When the Config Req is received from the printer 10A, the terminal 100 generates CO for printer in T140. Specifically, the terminal 100 firstly generates Signed Connector (hereafter "SC") for printer which is information to be used by the printer 10A for establishing Wi-Fi connection. The SC for printer includes, for example, a group ID which is an identifier identifying wireless network. The terminal 100 then generates the CO for printer including the SC for printer, and sends Config Res including the CO for printer to the printer 10A via the Wi-Fi I/F 116 in T142.

When the Config Res is received from the terminal 100 via the Wi-Fi I/F 16 in T142, the printer 10A sends Config Result to the terminal 100 via the Wi-Fi I/F 16 in T144. The Config Result includes information indicating that Config has succeeded. The processes of T140 to T144 correspond to Config of DPP.

The printer 10A sends Discovery Req including the SC for printer to the AP 6 via the Wi-Fi I/F 16 in T146. The Discovery Req is a signal for requesting SC of a counterpart to be sent.

When the Discovery Req is received from the printer 10A in T146, the AP 6 authenticates the SC for printer included in the Discovery Req by using SC for AP. When the SC for printer is successfully authenticated, the AP 6 generates a connection key. The AP 6 then sends Discovery Res including the SC for AP to the printer 10A in T148.

When the Discovery Res is received from the AP 6 in T148, the printer 10A authenticates the SC for AP included in the Discovery Res by using the SC for printer. When the SC for AP is successfully authenticated, the printer 10A generates a connection key. The connection key generated here is the same as the connection key generated by the AP 6. That is, the connection key is shared by the printer 10A and the AP 6.

Subsequently, the printer 10A communicates 4 way-handshake with the AP 6 by using the connection key. As a result of this, Wi-Fi connection is established between the printer 10A and the AP 6 in T150. As the Wi-Fi connection is already established (present) between the terminal 100 and the AP 6, the terminal 100 and the printer 10A are able to communicate with each other via the AP 6. The processes of T146 to T150 correspond to Network Access of DPP.

Although not illustrated, when Wi-Fi connection with the AP 6 is established, the printer 10A stores the CO for printer in the memory 34. From this on, in the printer 10A, "Required" is used instead of "Not Required" as the DPP shift operation information. Wi-Fi connection is established (i.e., Wi-Fi connection is present) between the printer 10A and a device (in the present case the AP 6) under a situation where the CO for printer is stored. If the DPP shift operation information is "Not Required" under such situation (i.e., if the printer 10A automatically shifts to the DPP respondent state in response to the power of the printer 10A being turned on), the printer 10A might undesirably execute the DPP process in unintended situations by the user. In this case, Wi-Fi connection with the AP 6 might be disconnected due to receiving new CO for printer in response to the printer 10A deleting the stored CO for printer. In order to restrict such situations, once Wi-Fi connection is established between the printer 10A and the AP 6, i.e., once the printer stores the CO for printer, the DPP shift operation information is changed from "Not Required" to "Required."

When Wi-Fi connection with the AP 6 is established, the printer 10A sends Status Query Result including information "Success" indicating that Wi-Fi connection is established to the terminal 100 via the Wi-Fi I/F 16 in T152.

The terminal 100 receives the Status Query Result including Success from the printer via the Wi-Fi I/F 116 in T152.

As mentioned above, the printer 10A can establish Wi-Fi connection with the AP 6. Due to this, the printer 10A can receive print data representing an image to be printed from the terminal 100 via the AP 6 and can print the image represented by the print data.

Figure 6:
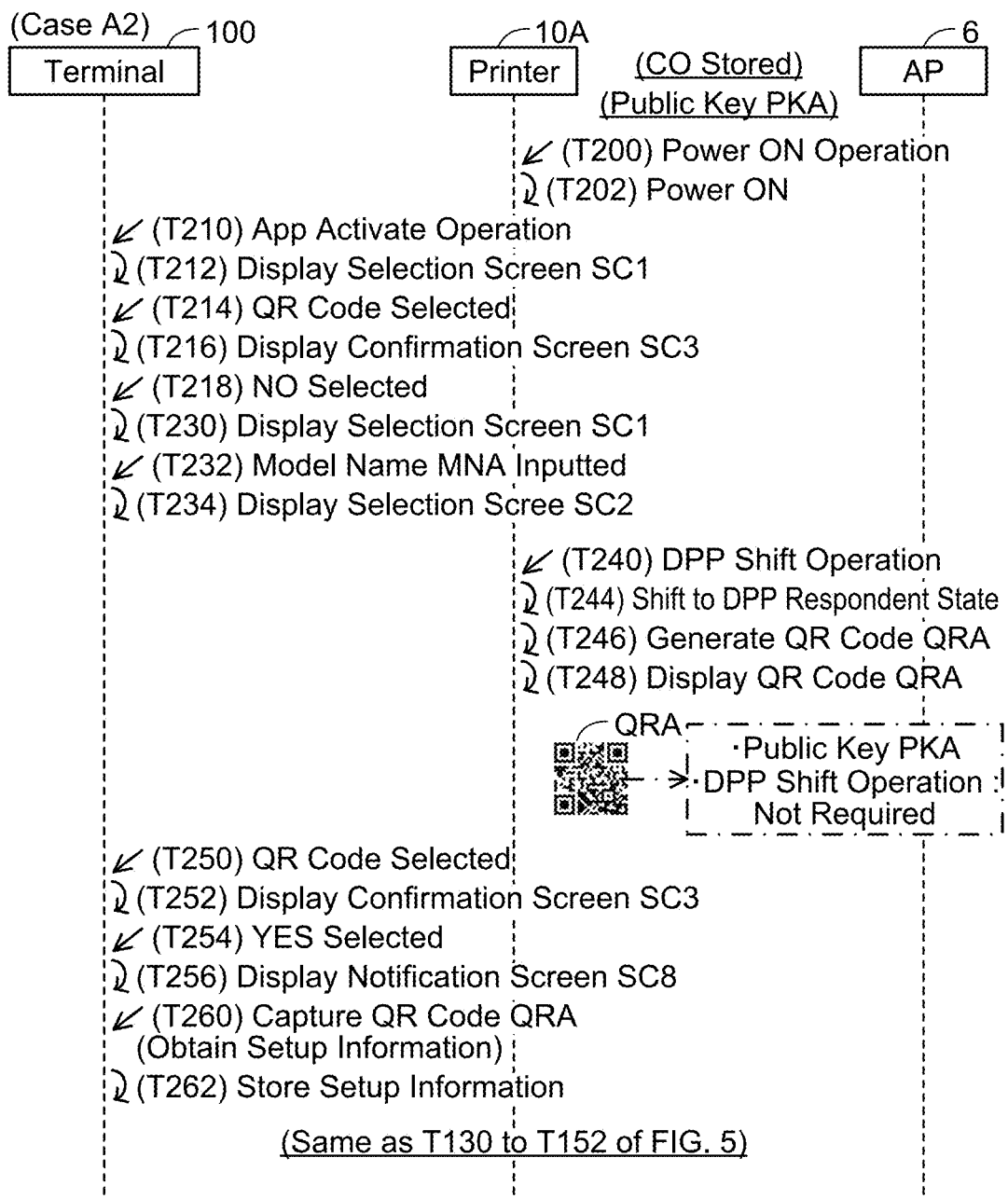
FIG. 6 illustrates a sequence diagram of Case A2.

(Case A2; FIG. 6)

Subsequently, with reference to FIG. 6, Case A2 will be described. Case A2 is a case where the DPP process is executed between the terminal 100 and the printer 10A. In particular in Case A2, the printer 10A does not automatically shift to the DPP respondent state due to having CO stored therein when the power is turned on.

When an operation of turning on the power of the printer 10A is performed by the user in T200 of FIG. 6, the power of the printer 10A is turned on in T202. In the present case, since the printer 10A already has CO stored therein, the printer 10A does not automatically shift to the DPP respondent state.

Processes of T210 to T216 are the same as the processes of T110 to T116 of FIG. 5. In the present case, since the printer 10A has not shifted to the DPP respondent state, QR Code is not displayed on the printer 10A. Accordingly, the app 138 accepts selection of the NO button in the confirmation screen SC3 in T218 (NO in S24 of FIG. 3). In this case, the app 138 causes the selection screen SC1 to be displayed again on the display unit 114 in T230 (S10). The selection screen SC1 displayed in T230 may further include a message prompting the user to input a model name, in addition to the content of the selection screen displayed in T212.

The app 138 accepts input of a model name MNA into the model name inputting section (see FIG. 3) in the selection screen SC1 in T232 (YES in S12). In this case, the app 138 causes the selection screen SC2 to be displayed on the display unit 114 in T234 (S14). As such, as the app 138 is able to present what operation the user should perform when QR Code cannot be found, user convenience may be improved.

As shown in FIG. 3, the selection screen SC2 includes a message M1. When the DPP shift operation is accepted from the user who saw the message M1 in T240, the printer 10A shifts to the DPP respondent state in T244, generates the QR Code QRA in T246, and displays the QR Code QRA on the display unit 14 in T248. Here, the DPP shift operation information indicates "Not Required" because the printer 10A has already shifted to the DPP respondent state upon when the QR Code QRA is displayed although the DPP shift operation information indicates "Required" under the initial state of FIG. 6. Processes of T250 to T262 are the same as the processes of T114 to T122 of FIG. 5. Thereafter, the processes the same as those of T130 to T152 of FIG. 5, and thus Wi-Fi connection is established between the printer 10A and the AP 6.

Figure 7:
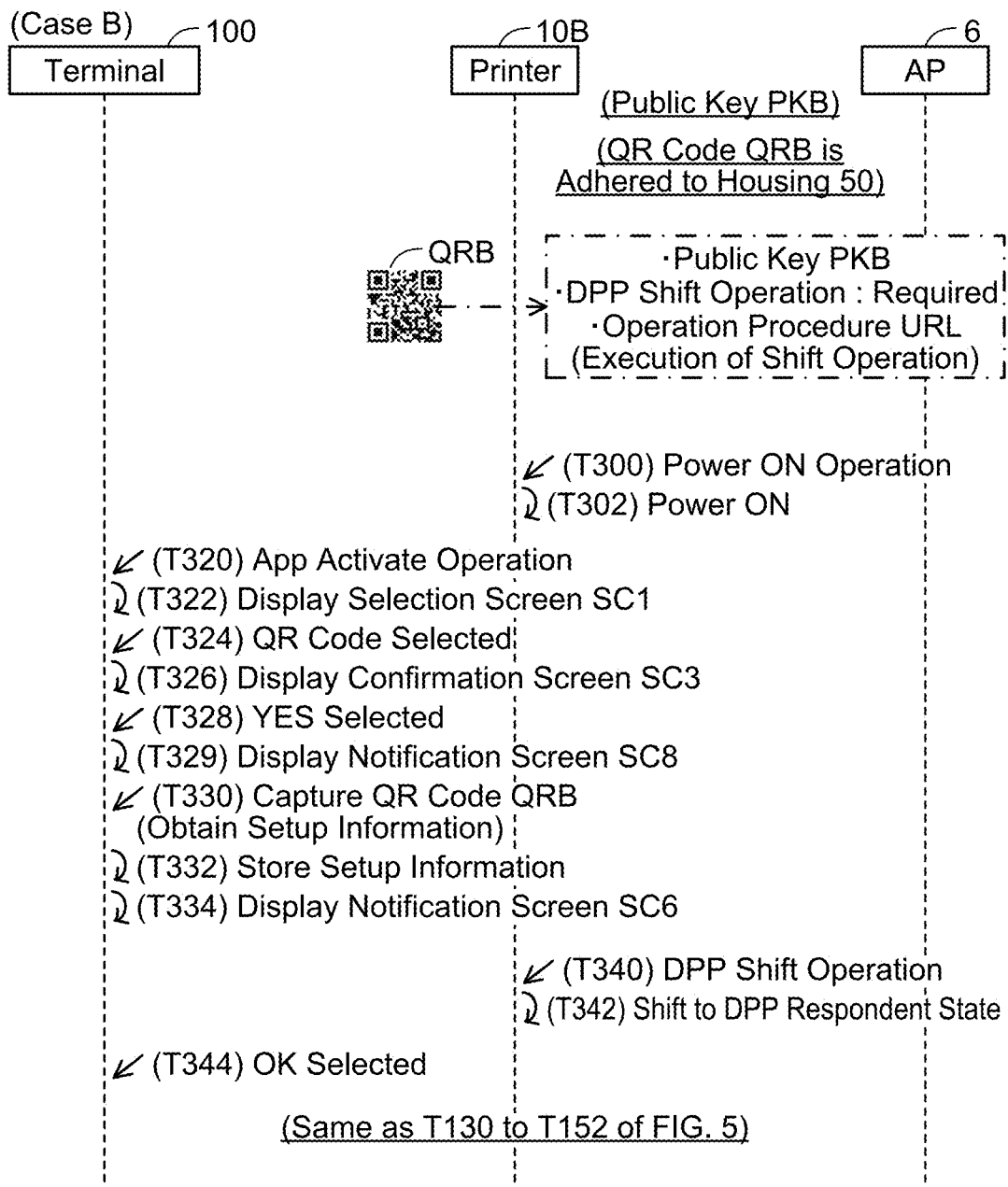
FIG. 7 illustrates a sequence diagram of Case B.

(Case B; FIG. 7)

Subsequently, with reference to FIG. 7, Case B will be described. Case B is a case where the DPP process is executed between the terminal 100 and the printer 10B. The printer 10B has a public key PKB and a private key (not illustrated) corresponding to the public key PKB stored therein. The printer 10B comprises the housing 50 with QR Code QRB affixed thereon (see FIG. 1). The QR Code QRB is information obtained by coding the setup information (i.e., the public key PKB, the DPP shift operation information "Required", and the operational procedure URL indicating the first URL which is a URL of the webpage indicating the execution of the shift operation). Processes of T300 and T302 are the same as the processes of T100 and T102 of FIG. Further, processes of T320 to T332 are the same as the processes of T110 to T122 of FIG. 5 except that the QR Code QRB is captured and the setup information is different.

The app 138 causes the notification screen SC6 to be displayed on the display unit 114 in T334 (S60) because the DPP shift operation information included in the obtained setup information indicates "Required" (YES in S52 of FIG. 4) and the operational procedure URL is the first URL ("first URL" in S54).

When the DPP shift operation is accepted from the user who saw the notification screen SC6 in T340, the printer 10B shifts to the DPP respondent state in T342.

The app 138 accepts selection of the OK button in the notification screen SC6 in T344 (YES in S62). Thereafter, the processes the same as T130 to T152 of FIG. 5 are executed, except that the public key PKB is used and subject of the process is the printer 10B, and thus Wi-Fi connection is established between the printer 10B and the AP 6.

Figure 8:
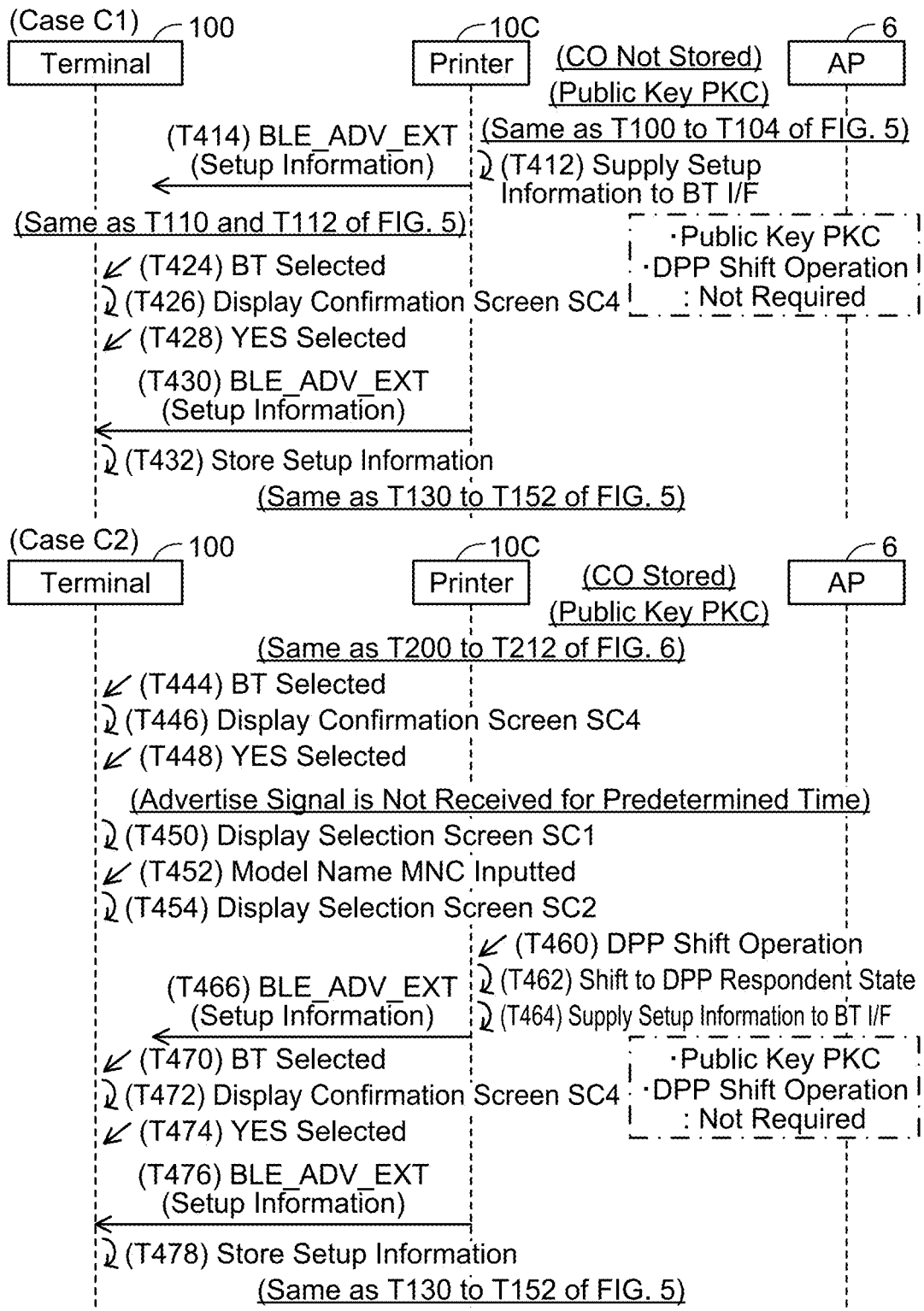
FIG. 8 illustrates sequence diagrams of Case C1 and Case C2.

(Case C1; FIG. 8)

Subsequently, with reference to FIG. 8, Case C1 will be described. Case C1 is a case where the DPP process is executed between the terminal 100 and the printer 10C. Under an initial state of Case C1, the printer 10C has a public key PKC and a private key (not illustrated) corresponding to the public key PKC stored therein. In Case C1, the printer 10C automatically shifts to the DPP respondent state due to not having CO stored therein when the power is turned on. In Case C1, processes the same as T100 to T104 of FIG. 5 are firstly executed.

The printer 10C supplies the setup information to the BT I/F 20 in T412. The setup information in the present case includes the public key PKC and the DPP shift operation information "Not Required".

The printer 10C repeatedly sends BLE_ADV_EXT which is Advertise signal including the setup information. At T414, the Advertise signal is not received by the terminal 100.

Thereafter, processes the same as T110 and T112 of FIG. 5 are executed, and thus the selection screen SC1 is displayed (S10 in FIG. 3). When selection of the mark indicating BT in the selection screen SC1 is accepted from the user in T424 (YES in S30), the app 138 causes the confirmation screen SC4 to be displayed on the display unit 114 in T426 (S32). Thereafter when selection of the YES button in the confirmation screen SC4 is accepted in T428 (YES in S34), the app 138 shifts a state of the BT I/F 120 of the terminal 100 from a state incapable of receiving the Advertise signal to a state capable of receiving the Advertise signal (S36). As a result of this, the app 138 receives the Advertise signal from the printer 10C and thus obtains the setup information in T430 (YES in S38), and stores the obtained setup information in the memory 134 in T432. Thereafter, the processes the same as T130 to T152 of FIG. 5 are executed, except that the public key PKC is used and subject of the process is the printer 10C, and thus Wi-Fi connection is established between the printer 10C and the AP 6.

In particular in T132 mentioned in FIG. 8, the printer 10C stops the sending of the Advertise signal after the printer 10C shifts to the DPP non-respondent state.

(Case C2; FIG. 8)

Subsequently, with reference to FIG. 8, Case C2 will be described. Case C2 is a case where the DPP process is executed between the terminal 100 and the printer 10C. In Case C2, the printer 10C does not automatically shift to the DPP respondent state due to having CO already stored therein when the power is turned on. In Case C2, processes the same as T200 to T212 of FIG. 6 are firstly executed. Processes of T444 to T448 are the same as the processes of T424 to T428.

In the present case, since the printer 10C has not shifted to the DPP respondent state, the printer 10C does not send the Advertise signal. Accordingly, the app 138 does not receive the Advertise signal from the printer 10C. The app 138 causes the selection screen SC1 to be displayed again on the display unit 114 in T450 (S10) when the Advertise signal is not received for a certain period of time (NO in S38).

The app 138 accepts input of a model name MNC into the model name inputting section (see FIG. 3) in the selection screen SC1 in T452 (YES in S12). In this case, the app 138 causes the selection screen SC2 to be displayed on the display unit 114 in T454 (S14). As such, because the app 138 can present what operation the user should perform when the Advertise signal is not received (i.e., when the public key PKC is not received), user convenience may be improved.

As shown in FIG. 3, the selection screen SC2 includes the message M1. When the DPP shift operation is accepted from the user who saw the message M1 in T460, the printer 10C shifts to the DPP respondent state in T462 and supplies the setup information to the BT I/F 20 in T464. Here, because the printer 10C has already shifted to the DPP respondent state when the setup information is supplied to the BT I/F 20, the DPP shift operation information indicates "Not Required", although the DPP shift operation information indicates "Required" under the initial state of Case C2. The process of T466 is the same as the process of T414. Further, processes of T470 to T478 are the same as the processes of T424 to T432. Thereafter, the processes the same as T130 to T152 of FIG. 5 are executed, except that the public key PKC is used and subject of the process is the printer 10C, and thus Wi-Fi connection is established between the printer 10C and the AP 6.

Figure 9:
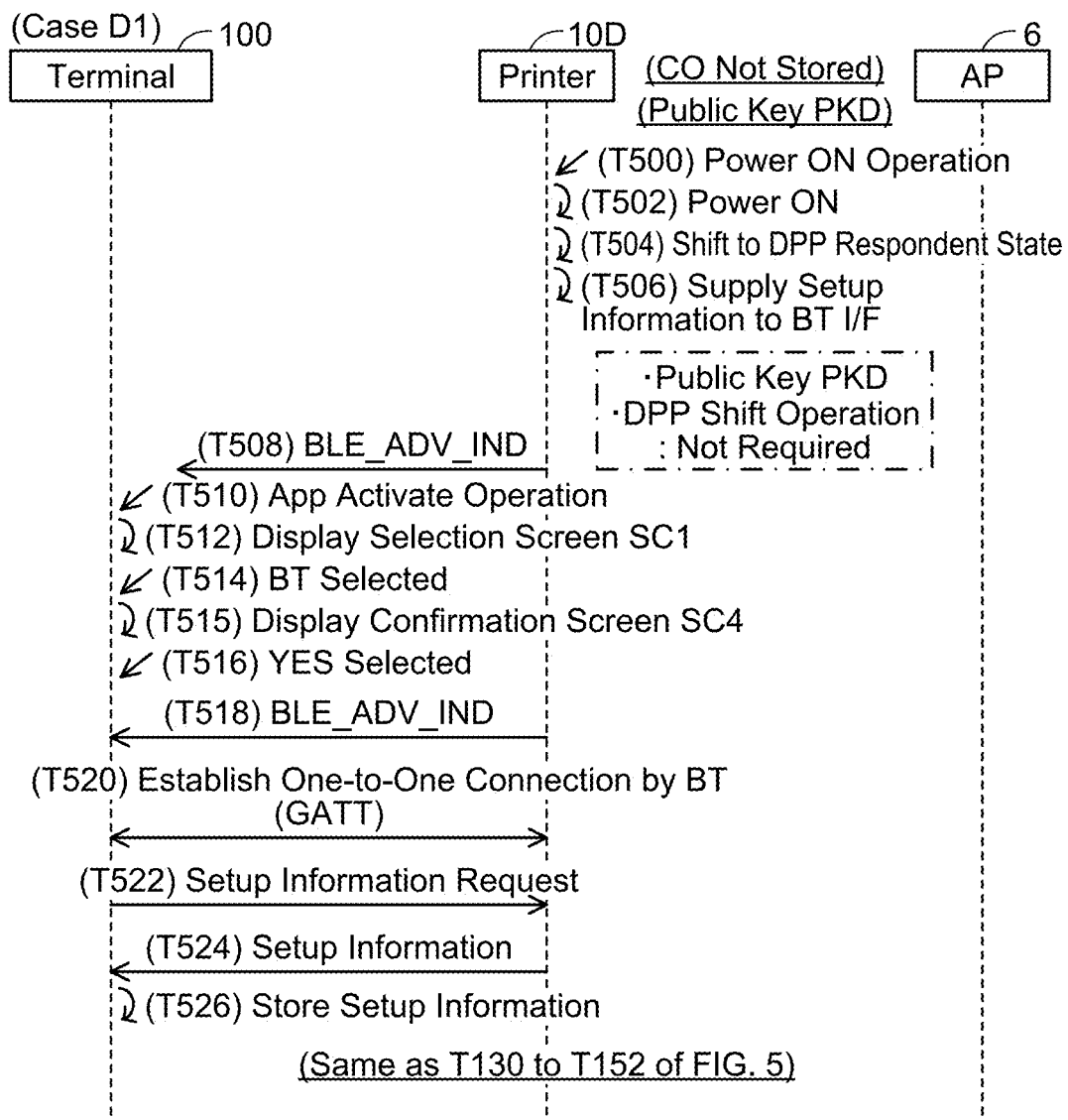
FIG. 9 illustrates a sequence diagram of Case D1.

(Case D1; FIG. 9)

Subsequently, with reference to FIG. 9, Case D1 will be described. Case D1 is a case where the DPP process is executed between the terminal 100 and the printer 10D. Under an initial state of Case D1, the printer 10D has a public key PKD and a private key (not illustrated) corresponding to the public key PKD stored therein. In Case D1, the printer 10D automatically shifts to the DPP respondent state due to not having CO stored therein when the power is turned on. Processes of T500 to T504 are the same as the processes of T100 to T104 of FIG. 5. Further, the process of T506 is the same as the process of T412 of FIG. 8 except that the setup information is different (specifically, the public key PKD is used).

The printer 10D repeatedly sends BLE_ADV IND which is an Advertise signal. This Advertise signal does not include the setup information. At T508, the Advertise signal is not received by the terminal 100.

Processes of T510 and T512 are the same as the processes of T110 and T112 of FIG. 5. When selection of the mark indicating BT in the selection screen SC1 is accepted in T514 (YES in S30), the app 138 causes the confirmation screen SC4 to be displayed on the display unit 114 in T515 (S32). Thereafter when selection of the YES button in the confirmation screen SC4 is accepted in T516 (YES in S34), the app 138 shifts a state of the BT I/F 120 of the terminal 100 from a state incapable of receiving the Advertise signal to a state capable of receiving the Advertise signal (S36). As a result of this, the app 138 receives the Advertise signal from the printer 10D in T518, and establishes one-to-one connection by BT (i.e., GATT connection) in T520 (S36).

Thereafter, the app 138 sends a setup information request to the printer 10D by using the GATT connection via the BT I/F 120 in T522.

When the setup information request is received from the terminal 100 in T522, the printer 10D sends the setup information to the terminal 100 via the BT I/F 20 in T524 by using the GATT connection.

When the setup information is received from the printer 10D (YES in S38) in T524, the app 138 stores the received setup information in the memory 134. Thereafter, the processes the same as T130 to T152 of FIG. 5 are executed, except that the public key PKD is used and subject of the process is the printer 10D, and thus Wi-Fi connection is established between the printer 10D and the AP 6. In particular in T132 mentioned in FIG. 9, the printer 10D stops the sending of the Advertise signal when the printer 10D has shifted to the DPP non-respondent state.

Figure 10:
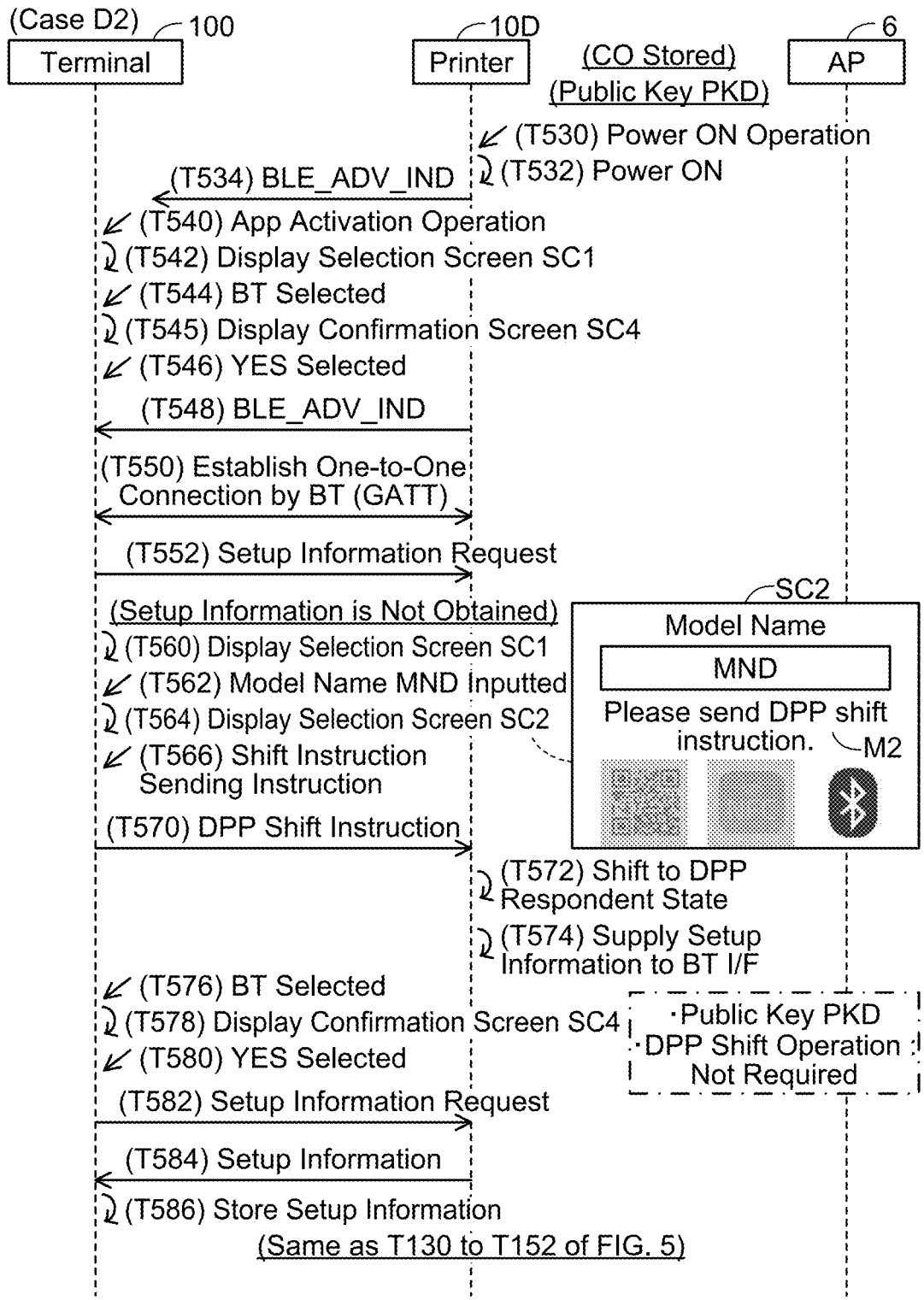
FIG. 10 illustrates a sequence diagram of Case D2.

(Case D2; FIG. 10)

Subsequently, with reference to FIG. 10, Case D2 will be described. Case D2 is a case where the DPP process is executed between the terminal 100 and the printer 10D. In Case D2, the printer 10D does not automatically shift to the DPP respondent state due to having CO already stored therein when the power is turned on. Processes of T530 and T532 are the same as the processes of T100 and T102 of FIG. 5. A process of T534 is the same as the process of T508 of FIG. 9.

Processes of T540 to T552 are the same as the processes of T510 to T522 of FIG. 9. In the present case, the printer 10D has not supplied the setup information to the BT I/F 20 because the printer 10D has not shifted to the DPP respondent state. Accordingly, the app 138 does not receive the setup information from the printer 10D (NO in S38 of FIG. 3). In this case, the app 138 causes the selection screen SC1 to be displayed again on the display unit 114 in T560 (S10).

The app 138 accepts input of model name MND into the model name inputting section (see FIG. 3) in the selection screen SC1 in T562 (YES in S12). In this case, the app 138 causes the selection screen SC2 to be displayed on the display unit 114 in T564 (S14). The selection screen SC2 displayed here includes a message M2 indicating what operation the user should perform to shift the state of the printer 10D from the DPP non-respondent state to the DPP respondent state. Further on the selection screen SC2 displayed here, the mark indicating QR Code and the mark indicating NFC are displayed with shading, and the mark indicating BT is displayed in the selectable manner by which the mark can be selected.

When an operation for sending the shift instruction is accepted from the user who saw the message M2 in the selection screen SC2 in T566, the app 138 sends the DPP shift instruction to the printer 10D via the BT I/F 120 by using the GATT connection in T570.

When the DPP shift instruction is received from the terminal 100 in T570, the printer shifts to the DPP respondent state in T572 and supplies the setup information to the BT I/F 20 in T574. Here, because the printer 10D has already shifted to the DPP respondent state when the setup information is supplied to the BT I/F 20, the DPP shift operation information indicates "Not Required", although the DPP shift operation information indicates "Required" under the initial state of Case D2. Processes of T576 to T586 are the same as the processes of T514 to T516 and T522 to T526 of FIG. 9. Thereafter, the processes the same as T130 to T152 of FIG. 5 are executed, except that the public key PKD is used and subject of the process is the printer 10D, and thus Wi-Fi connection is established between the printer 10D and the AP 6. In particular in T132 mentioned in FIG. 10, the printer 10D stops the sending of the Advertise signal when the printer has shifted to the DPP non-respondent state.

Figure 11:
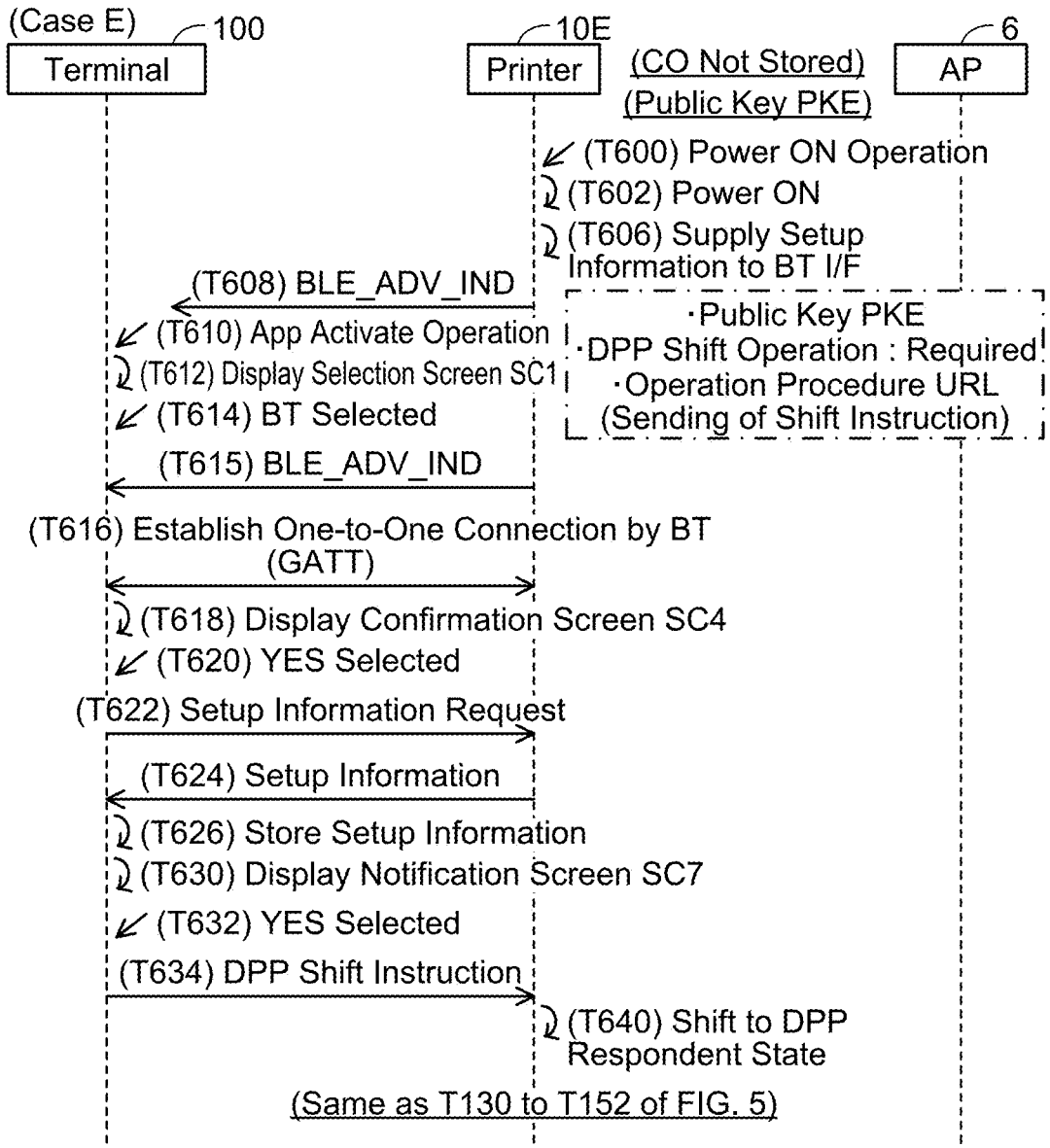
FIG. 11 illustrates a sequence diagram of Case E.

(Case E; FIG. 11)

Subsequently, with reference to FIG. 11, Case E will be described. Case E is a case where the DPP process is executed between the terminal 100 and the printer 10E. Under an initial state of Case E, the printer 10E has a public key PKE and a private key (not illustrated) corresponding to the public key PKE stored therein. In Case E, the printer 10E does not automatically shift to the DPP respondent state when the power is turned on although the printer does not have CO stored therein. Processes of T600 and T602 are the same as the processes of T100 and T102 of FIG. 5. Further, processes of T606 and T608 are the same as the process of T506 and T508 of FIG. 9 except that the setup information is different. The setup information includes the public key PKE, the DPP shift operation information "Required", and an operational procedure URL indicating the second URL which is the URL of a webpage indicating the sending of the shift instruction.

Processes of T610 to T626 are the same as the processes of T510 to T526 of FIG. 9 except that the setup information is different. When the setup information is obtained (YES in S38 of FIG. 3), the app 138 causes the notification screen SC7 to be displayed on the display unit 114 in T630 (S70) because the DPP shift operation information included in the obtained setup information indicates "Required" (YES in S52 of FIG. 4) and the operational procedure URL is the second URL ("second URL" in S54).

When selection of the YES button in the notification screen SC7 is accepted in T632 (YES in S72), the app 138 sends the DPP shift instruction to the printer 10E via the BT I/F 120 by using the GATT connection in T634 (S74).

When the DPP shift instruction is received from the terminal 100 in T634, the printer shifts to the DPP respondent state in T640. Thereafter, the processes the same as T130 to T152 of FIG. 5 are executed, except that the public key PKE is used and subject of the process is the printer 10E, and thus Wi-Fi connection is established between the printer 10E and the AP 6.

Figure 12:
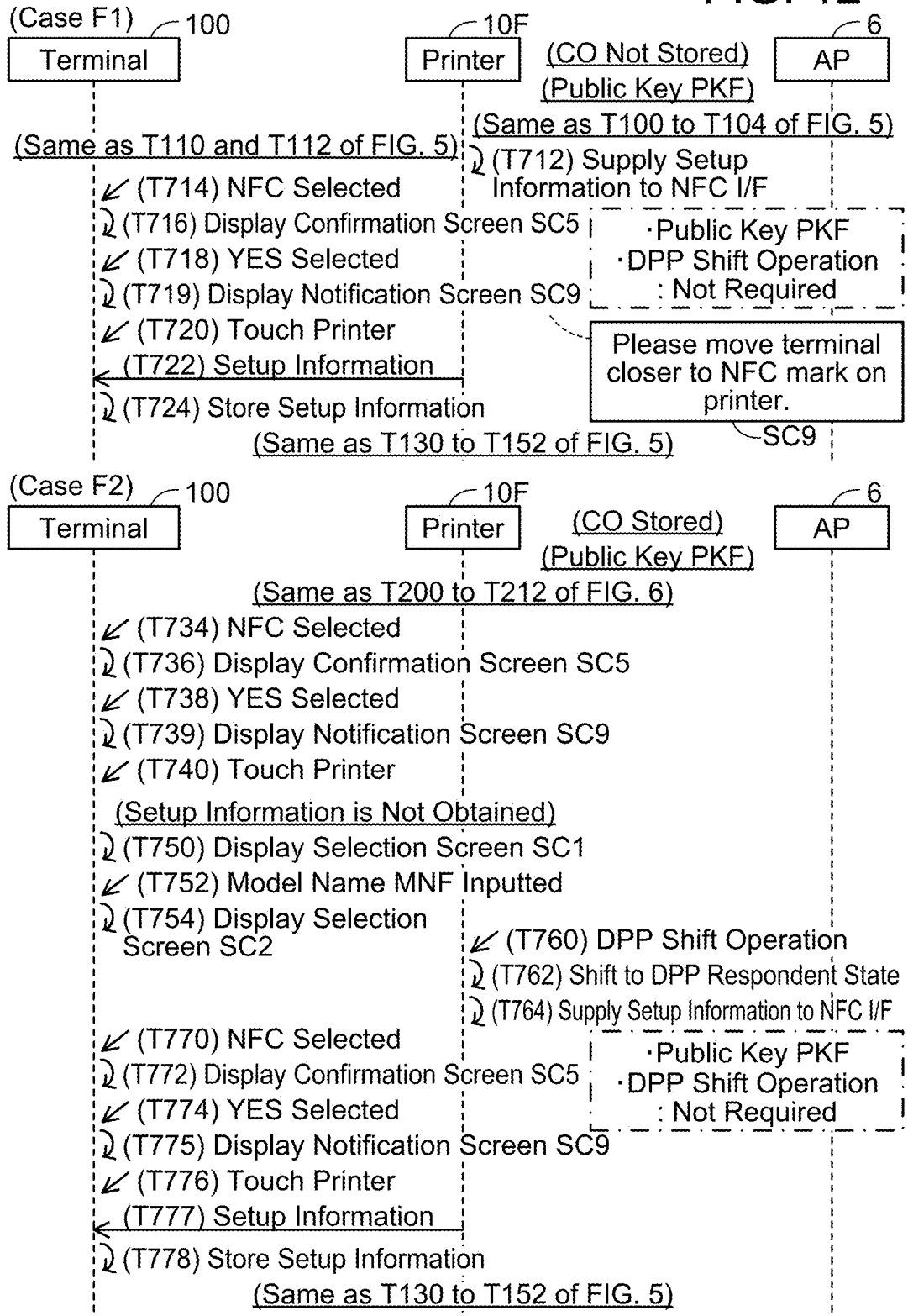
FIG. 12 illustrates sequence diagrams of Case F1 and Case F2.

(Case F1; FIG. 12)

Subsequently, with reference to FIG. 12, Case F1 will be described. Case F1 is a case where the DPP process is executed between the terminal 100 and the printer 10F. Under an initial state of Case F1, the printer 10F has a public key PKF and a private key (not illustrated) corresponding to the public key PKF stored therein. In Case F1, the printer 10F automatically shifts to the DPP respondent state due to not having CO stored therein when the power is turned on. In Case F1, processes the same as T100 to T104 of FIG. 5 are firstly executed.

The printer 10F supplies the setup information to the NFC I/F 22 and shifts a state of the NFC I/F 22 from a state incapable of NFC communication to a state capable of NFC communication in T712. The setup information in the present case includes the public key PKF and the DPP shift operation information "Not Required".

Thereafter, processes the same as T110 and T112 of FIG. 5 are executed and the selection screen SC1 is displayed (S10 in FIG. 3). When the mark indicating NFC in the selection screen SC1 is accepted from the user in T714 (YES in S40), the app 138 causes the confirmation screen SC5 to be displayed on the display unit 114 in T716. Thereafter, when selection of the YES button in the confirmation screen SC5 is accepted in T718 (YES in S44), the app 138 shifts the state of the NFC I/F 122 of the terminal 100 from the state incapable of NFC communication to the state capable of NFC communication (S46). Further, the app 138 causes a notification screen SC9 to be displayed on the display unit 114 in T719. The notification screen SC9 includes a message prompting the user to move the terminal 100 closer to the printer 10F. Due to this, the user can acknowledge that he/should move the terminal 100 closer to the printer 10F.

The user of the terminal 100 who saw the notification screen SC9 moves the terminal 100 to the printer 10F and thus establishes NFC connection between the terminal 100 and the printer 10F in T720. The terminal 100 then receives the setup information from the printer 10F (YES in S48) via the NFC I/F 122 by using the NFC connection in T722 and stores the received setup information in the memory 134 in T724. Thereafter, the processes the same as T130 to T152 of FIG. 5 are executed, except that the public key PKF is used and subject of the process is the printer 10F, and thus Wi-Fi connection is established between the printer 10F and the AP 6. In T132 mentioned in FIG. 12, the printer 10F shifts the state of the NFC I/F 22 from the state capable of NFC communication to the state incapable of NFC communication when the printer 10F has shifted to the DPP non-respondent state.

(Case F2; FIG. 12)

Subsequently, with reference to FIG. 12, Case F2 will be described. Case F2 is a case where the DPP process is executed between the terminal 100 and the printer 10F. In Case F2, the printer 10F does not automatically shift to the DPP respondent state due to having CO already stored therein when the power is turned on. In Case F2, processes the same as T200 to T212 of FIG. 6 are firstly executed. Processes of T734 to T740 are the same as the processes of T714 to T720.

In the present case, because the printer 10F has not shifted to the DPP respondent state, the setup information has not been supplied to the NFC I/F 22 of the printer 10F. Accordingly, the app 138 does not receive the setup information from the printer 10F. When the setup information is not obtained (NO in S48), the app 138 causes the selection screen SC1 to be displayed again on the display unit 114 in T750 (S10).

The app 138 accepts input of a model name MNF into the model name inputting section (see FIG. 3) in the selection screen SC1 in T752 (YES in S12). In this case, the app 138 causes the selection screen SC2 to be displayed on the display unit 114 in T754 (S14).

As shown in FIG. 3, the selection screen SC2 includes the message M1. When the DPP shift operation is accepted from the user who saw the message M1 in T760, the printer 10F shifts to the DPP respondent state in T762, and supplies the setup information to the NFC I/F 22 in T764. Here, because the printer 10F has already shifted to the DPP respondent state when the setup information is supplied to the NFC I/F 22, the DPP shift operation information indicates "Not Required", although the DPP shift operation information indicates "Required" under the initial state of Case F2. Processes of T770 to T778 are the same as the processes of T714 to T724. Thereafter, the processes the same as T130 to T152 of FIG. 5 are executed, except that the public key PKF is used and subject of the process is the printer 10F, and thus Wi-Fi connection is established between the printer 10F and the AP 6.

Figure 13:
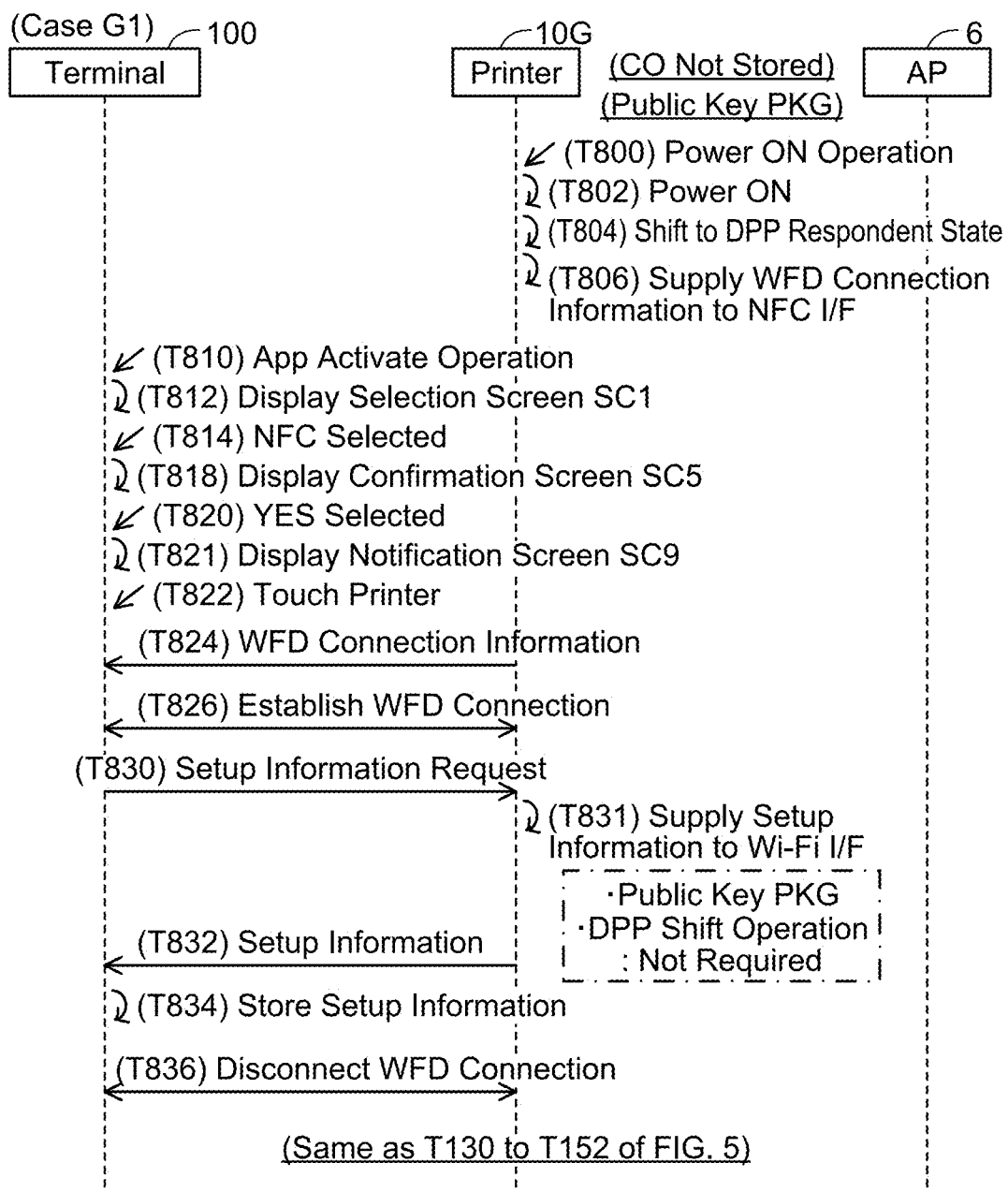
FIG. 13 illustrates a sequence diagram of Case G1.

(Case G1; FIG. 13)

Subsequently, with reference to FIG. 13, Case G1 will be described. Case G1 is a case where the DPP process is executed between the terminal 100 and the printer 10G. Under an initial state of Case G1, the printer 10G has a public key PKG and a private key (not illustrated) corresponding to the public key PKG stored therein. In Case G1, the printer 10G automatically shifts to the DPP respondent state due to not having CO stored therein when the power is turned on. Processes of T800 to T804 are the same as the processes of T100 to T104 of FIG. 5.

The printer 10G supplies WFD connection information to the NFC I/F 22 in T806. The WFD connection information is information used for establishing WFD connection between the printer 10G and the terminal 100 (e.g., service set identifier (SSID) of wireless network in which the printer 10G operates as a parent station of WFD).

Processes of T810 and T812 are the same as the processes of T110 and T112 of FIG. 5. Also, processes of T814 to T822 are the same as the processes of T714 to T720 of FIG. 12.

The app 138 receives the WFD connection information from the printer 10G via the NFC I/F 122 by using the NFC connection in T824, and establishes WFD connection with the printer 10G by using the received WFD connection information in T826 (S46).

The app 138 sends the setup information request to the printer 10G via the Wi-Fi I/F 116 by using the WFD connection in T830.

When the setup information request is received from the terminal 100 in T830, the printer 10G supplies the setup information to the Wi-Fi I/F 16 in T831, and sends the setup information to the terminal 100 via the Wi-Fi I/F 16 by using the WFD connection in T832. The setup information in the present case includes the public key PKG and the DPP shift operation information "Not Required".

When the setup information is received from the printer 10G (YES in S48), the app 138 stores the setup information in T834. Thereafter, the WFD connection between the terminal 100 and the printer 10G is disconnected in T836.

Thereafter, the processes the same as T130 to T152 of FIG. 5 are executed, except that the public key PKG is used and subject of the process is the printer 10G, and thus Wi-Fi connection is established between the printer 10G and the AP 6. In T132 mentioned in FIG. 13, the printer shifts the state of the NFC I/F 22 from the state capable of NFC communication to the state incapable of NFC communication when the printer 10G has shifted to the DPP non-respondent state.

Figure 14:
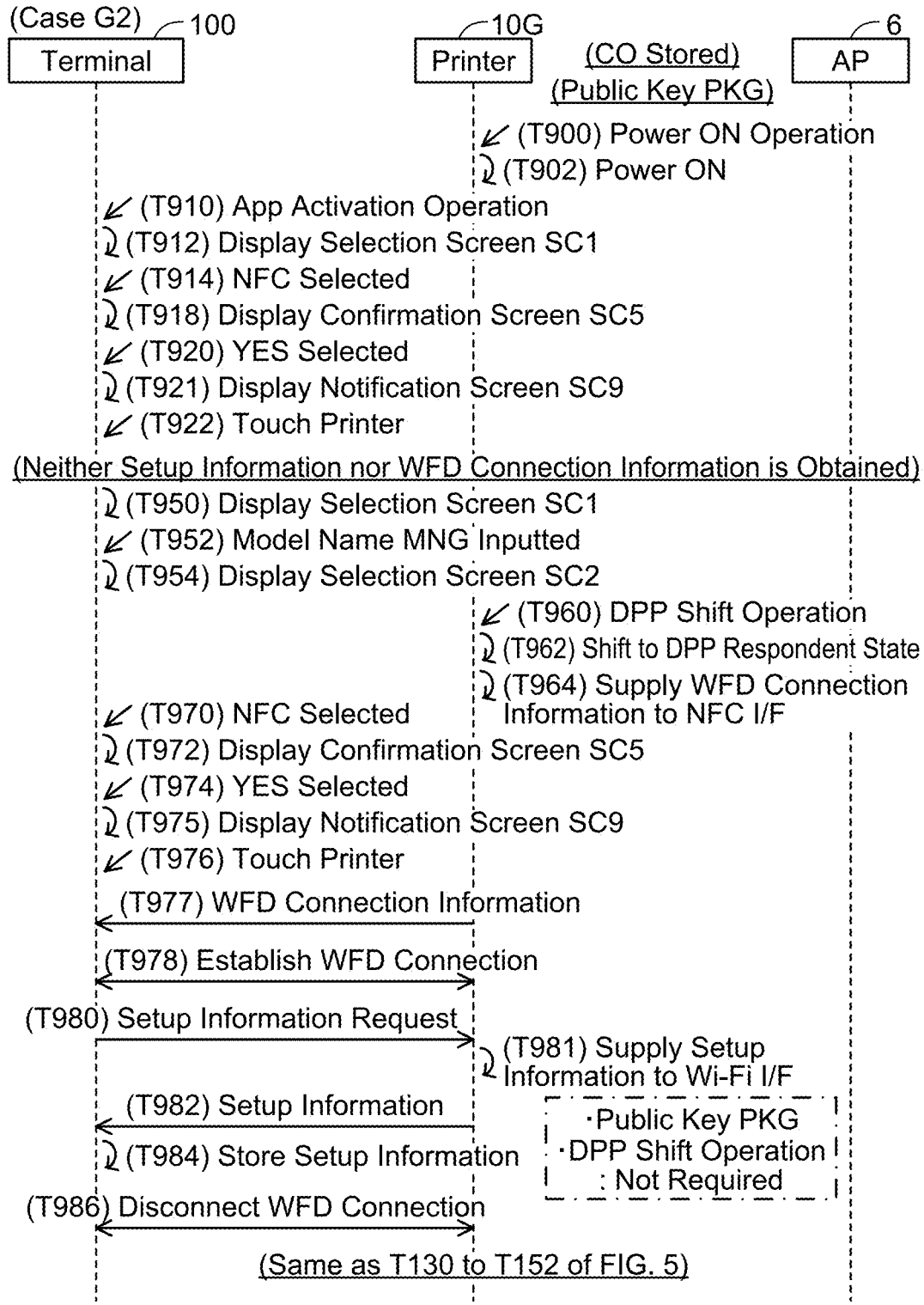
FIG. 14 illustrates a sequence diagram of Case G2.

(Case G2; FIG. 14)

Subsequently, with reference to FIG. 14, Case G2 will be described. Case G2 is a case where the DPP process is executed between the terminal 100 and the printer 10G. In Case G2, the printer 10G does not automatically shift to the DPP respondent state due to having CO already stored therein when the power is turned on. Processes of T900 and T902 are the same as the processes of T100 and T102 of FIG. 5. Further, processes of T910 to T922 are the same as the processes of T810 to T822 of FIG. 13.

In the present case, neither of the setup information nor the WFD connection information have been supplied to the NFC I/F 22 of the printer 10G. Due to this, even when the terminal 100 is brought into contact with the printer 10G, the app 138 does not obtain the setup information or the WFD connection information (NO in S48 of FIG. 3). In this case, the app 138 causes the selection screen SC1 to be displayed again on the display unit 114 in T950 (S10).

The app 138 accepts input of a model name MNG into the model name inputting section (see FIG. 3) in the selection screen SC1 in T952 (YES in S12). In this case, the app 138 causes the selection screen SC2 to be displayed on the display unit 114 in T954 (S14).

As shown in FIG. 3, the selection screen SC2 includes the message M1. When the DPP shift operation is accepted from the user who saw the message M1 in T960, the printer 10G shifts to the DPP respondent state in T962 and supplies the WFD connection information to the NFC I/F 22 in T964. Processes of T970 to T986 are the same as the processes of T814 to T836 of FIG. 13. Thereafter, the processes the same as T130 to T152 of FIG. 5 are executed, except that the public key PKG is used and subject of the process is the printer 10G, and thus Wi-Fi connection is established between the printer 10G and the AP 6.

Effects by Present Embodiment

According to the above configuration, the terminal 100 displays the selection screen SC1 (S10 of FIG. 3) indicating three obtaining methods (specifically, QR Code, NFC, and BT) for obtaining the public key of the printer (e.g. 10A), and displays the notification screen (e.g., SC8 (see FIG. 5)) corresponding to the specific obtaining method as selected (e.g., QR Code) (e.g., S26). As a result of this, the public key of the printer is obtained by the specific obtaining method (e.g., S28) and thus various communications such as sending of authentication request are executed (S80 of FIG. 4). Consequently, Wi-Fi connection can be appropriately established between the printer and the AP 6.

(Correspondence Relationship)

The terminal 100, each of the printers 10 (i.e., the printers 10A to 10G), and the AP 6 are an example of "first communication device", "second communication device", and "external device", respectively. The app 138 is an example of "computer-readable instructions". Each of the public keys (e.g., PKA) is an example of "bootstrapping key (and specific bootstrapping key)". QR Code, BT, and NFC, the three obtaining methods for obtaining public key, are an example of "M obtaining methods". Auth Req, Auth Res, and CO for printer are an example of "authentication request", "authentication response", and "connection information". BT communication and NFC communication are an example of "first communication" and "second communication". The selection screen SC1 is an example of "first method selection information (and model name acceptance information)". The notification screen SC8 (see FIG. 5), the confirmation screen SC4 (see FIG. 3), and the notification screen SC9 (see FIG. 12) are an example of "support information (and specific support information)". In particular, the message "Please capture QR Code" on the notification screen SC8, the message "Execute Setup?" on the confirmation screen SC4, and the message "Please move terminal closer to NFC mark on printer" on the notification screen SC9 are an example of "first message", "second message", and "third message", respectively. The selection screen SC2 is an example of "second method selection information (and first to third method information)". In particular, the selection screen SC2 displayed in T234 of FIG. 6 and the selection screen SC2 displayed in T454 of FIG. 9 are an example of the "second method information" and "third method information", respectively. The confirmation screen SC3 and the confirmation screen SC5 are an example of "first confirmation information" and "second confirmation information", respectively. The notification screen SC6 and the notification screen SC7 are an example of "fourth method information" and "third confirmation information", respectively. The DPP shift operation information is an example of "shift information". The DPP shift operation (e.g., T240 in FIG. 6) and the DPP shift instruction (e.g., T570 in FIG. 10) are an example of "predetermined operation" and "predetermined instruction", respectively. The operation indicated by the message M1 or M2 (i.e., operation for shifting from the DPP non-respondent state to the DPP respondent state) is an example of "first (to third) operation".

The process of S10 in FIG. 3 is an example of "cause the display unit to display first method selection information (and cause the display unit to display model name accepting information)". The process of S14 in FIG. 3 is an example of "cause the display unit to display first method information (cause the display unit to display second method information and cause the display unit to display third method information)". The process of S22 in FIG. 3 is an example of "cause the display unit to display first confirmation information". The process of S26, the process of S32, and the process of S46 in FIG. 3 are an example of "cause the display unit to display specific support information". The processes of S26, S38, and S48 are an example of "obtain by the specific obtaining method a specific bootstrapping key". The process of S42 in FIG. 3 is an example of "cause the display unit to display second confirmation information". The process of S40, the process of S70, and the process of S74 in FIG. 4 are an example of "cause the display unit to display fourth method information", "cause the display unit to display third confirmation information", and "send the predetermined instruction", respectively. The process of T130, the process of T134, and the process of T142 in FIG. 5 are an example of "send an authentication request", "receive an authentication response", and "execute communication of connection information", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) In each of the above embodiments, the DPP process is executed between the terminal 100 and the printer 10A in order to establish Wi-Fi connection between the printer 10A and the AP 6 for example. In a modification, the DPP process may be executed between the terminal 100 and the printer 10A in order to establish Wi-Fi connection between the terminal 100 and the AP 6. In the present modification, the printer 10A may operate as Configurator and the terminal 100 may operate as Enrollee, and thus the printer 10A may send CO for terminal to the terminal 100. In the present modification, the CO for terminal is an example of the "connection information". Also, in another modification, the DPP process may be executed between the terminal 100 and the printer 10A in order to establish Wi-Fi connection between the terminal 100 and the printer 10A. In the present modification, the terminal 100 or the printer 10A is an example of the "external device". Further, in another modification, the terminal 100 may send the CO for printer including SSID and password of the AP 6 to the printer 10A instead of sending the CO for printer including the SC for printer to the printer 10A. In the present modification, the CO for printer including the SSID and password of the AP 6 is an example of "connection information".

(Modification 2) In each of the embodiments, both the model name inputting section and the three setup information obtaining methods are included in the selection screen SC1 (see FIG. 3), but in a modification these may be displayed in separate screens. For example, the app 138 firstly displays a screen only including the model name inputting section, and when any model name is not inputted into the screen, the app 138 may display a screen including the three setup information obtaining methods. In the present modification, the screen only including the model name inputting section is an example of "model name acceptance information". Also, in another modification, the selection screen SC1 may not include the model name inputting section. In the present modification, "cause the display unit to display model name accepting information" may be omitted.

(Modification 3) In each of the embodiments, on the selection screen SC2 (see FIG. 3), only one mark indicating one setup information obtaining method (in the example of FIG. 3, the mark indicating QR Code) is selectable, and the remaining two marks indicating the two setup information obtaining methods (in the example of FIG. 3, the mark indicating NFC and the mark indicating BT) are displayed with shading. In a modification, the selection screen SC2 may not include the above-mentioned two marks displayed with shading but may only include the mark indicating QR Code. In the present modification, not including the two marks is an example of "displayed in an unselectable manner".

(Modification 4) The selection screen SC2 may not include the message M1. In the present modification, "cause the display unit to display first method information" may be omitted.

(Modification 5) The app 138 may omit the processes of T116 and T118 of FIG. 5, and may execute the process of T119. In this case, the notification screen SC8 displayed in T119 may include a message equivalent to the content of the confirmation screen SC3 (i.e., message inquiring the user whether QR Code has been found or not). That is, in the present modification, "first confirmation information" and "support information" may be displayed on a same screen. Further, in another modification, the process of S22 in FIG. 3 may be omitted. In the present modification, "cause the display unit to display first confirmation information" may be omitted.

(Modification 6) When NO is determined in S24 in FIG. 3, the app 138 may not return to the process of S10 but end the processes of FIG. 3. In this case, the app 138 may display information indicating setup error. In the modification, "cause the display unit to display second method information" may be omitted.

(Modification 7) The app 138 may omit the processes of S32 and S34 in FIG. 3. In this case, when YES is determined in S30, the app 138 may shift the state of the BT I/F 120 from the state incapable of receiving Advertise signal to the state capable of receiving Advertise signal. When the setup information is received by using BT communication, the app 138 may display information for confirming with the user whether to start the setup by extracting the public key from the setup information. In the present modification, the above information displayed after the setup information has been received is an example of the "second message".

(Modification 8) When NO is determined in S38 in FIG. 3, the app 138 may not return to the process of S10 but end the processes of FIG. 3. In this case, the app 138 may display information indicating setup error. In the present modification, "cause the display unit to display third method information" may be omitted.

(Modification 9) The app 138 may omit the processes of T716 and T718 of FIG. 12, and may execute the process of T719. In this case, the notification screen SC9 displayed in T719 for example may include a message equivalent to the content of the confirmation screen SC5 (i.e., message inquiring the user whether the NFC mark N1 has been found or not). That is, in the present modification, the "third confirmation information" and the "support information" may be displayed on a same screen. Also, in another modification, the process of S42 in FIG. 3 may be omitted. In the present modification, "cause the display unit to display second confirmation information" may be omitted.

(Modification 10) The setup information may not include the DPP shift operation information. In the present modification, "cause the display unit to display fourth method information" and "send the predetermined instruction" may be omitted.

(Modification 11) The app 138 may display the notification screen SC7 which includes none of the message inquiring whether to execute the DPP shift instruction or not and the YES and NO buttons in S70 in FIG. 4. In this case, the app 138 may send the DPP shift instruction to the target printer without accepting user operation, in response to the notification screen SC7 being displayed. In the present modification, "cause the display unit to display third confirmation information" may be omitted.

(Modification 12) In each of the above embodiments, the respective processes in FIGS. 3 to 14 are realized by software such as the program 36, but alternatively at least one of these processes may be realized by hardware such as logic circuit.

What is claimed is:

1. A non-transitory computer-readable recording medium storing computer-readable instructions for a first communication device, wherein
the first communication device comprises:
a Wi-Fi interface configured to execute Wi-Fi communication in conformity with a Wi-Fi standard;
a display unit; and
a processor,
wherein the computer-readable instructions, when executed by the processor, cause the first communication device to:
cause the display unit to display a model name inputting section for accepting an inputting of a model name of a communication device,
in a case where a model name is not inputted in a situation where the model name inputting section is displayed, cause the display unit to display first method selection information including M obtaining methods for obtaining a bootstrapping key of a different communication device different from the first communication device, M being an integer of equal to or greater than 2,
wherein in a case where a specific model name is inputted in the situation where the model name inputting section is displayed, cause the display unit to display second method selection information, wherein the second method selection information includes N obtaining methods according to a communication device having the specific model name among the M obtaining methods, wherein each of the N obtaining methods is displayed in a selectable manner, and N is an integer of equal to or greater than 1 and less than the M;
accept a selection of a specific obtaining method from among the M obtaining methods included in the first method selection information or the second method selection information;
in a case where the specific obtaining method is selected, cause the display unit to display specific support information corresponding to the specific obtaining method among M support information corresponding to the M obtaining methods, each of the M support information being for supporting obtaining of the bootstrapping key of the different communication device by a corresponding obtaining method corresponding to the support information;

after the specific obtaining method has been selected, obtain by the specific obtaining method a specific bootstrapping key which is a bootstrapping key of a second communication device different from the first communication device;

in a case where the specific bootstrapping key is obtained, send an authentication request in which the specific bootstrapping key is used to the second communication device via the Wi-Fi interface;

in a case where the authentication request is sent to the second communication device, receive an authentication response from the second communication device via the Wi-Fi interface; and in a case where the authentication response is received from the second communication device, execute communication of connection information with the second communication device via the Wi-Fi interface, the connection information being for establishing a Wi-Fi connection between the first communication device or the second communication device and an external device.

2. The non-transitory computer readable recording medium as in claim 1,
wherein the second method selection information further includes (M-N) obtaining methods different from the N obtaining methods among the M obtaining methods, and each of the (M-N) obtaining methods is displayed in an unselectable manner.

3. The non-transitory computer readable recording medium as in claim 1,
wherein the computer-readable instructions, when executed by the processor, further cause the first communication device to:
in the case where a model name is inputted in the situation where the model name inputting section is displayed, cause the display unit to display first method information indicating a first operation for shifting a state of a communication device having the inputted model name from a non-respondent state to a respondent state,
wherein the non-respondent state is a state where the communication device having the inputted model name is incapable of sending the authentication response, and
the respondent state is a state where the communication device having the inputted model name is capable of sending the authentication response.

4. The non-transitory computer readable recording medium as in claim 1,
wherein in a case where the specific obtaining method is capturing of a code image obtained by using the bootstrapping key of the different communication device, the specific support information includes a first message which prompts a user to capture the code image.

5. The non-transitory computer readable recording medium as in claim 2,
wherein the computer-readable instructions, when executed by the processor, further cause the first communication device to:
in the case where the specific obtaining method is capturing of a code image, cause the display unit to display first confirmation information for confirming with the user whether the code image has been found.

6. The non-transitory computer readable recording medium as in claim 5,
wherein the computer-readable instructions, when executed by the processor, further cause the first communication device to:
in a case where it is selected that the code image has not been found in a situation where the first confirmation information is displayed, cause the display unit to display second method information indicating a second operation for shifting a state of the different communication device from a non-respondent state to a respondent state,
wherein the non-respondent state is a state where the different communication device is incapable of sending the authentication response, and
the respondent state is a state where the different communication device is capable of sending the authentication response.

7. The non-transitory computer readable recording medium as in claim 1,
wherein in a case where the specific obtaining method is a first communication including Bluetooth communication, the specific support information includes a second message for confirming with a user whether to receive the bootstrapping key of the different communication device by using the first communication.

8. The non-transitory computer readable recording medium as in claim 7,
wherein the computer-readable instructions, when executed by the processor, further cause the first communication device to:
in a case where the bootstrapping key of the different communication device is not received after it has been selected that the bootstrapping key of the different communication device is to be received in a situation where the specific support information including the second message is displayed, cause the display unit to display third method information indicating a third operation for shifting a state of the different communication device from a non-respondent state to a respondent state,
wherein the non-respondent state is a state where the different communication device is incapable of sending the authentication response, and
the respondent state is a state where the different communication device is capable of sending the authentication response.

9. The non-transitory computer readable recording medium as in claim 1,
wherein in a case where the specific obtaining method is a second communication including Near Field Communication (NFC), the specific support information includes a third message which prompts a user to move the first communication device closer to the different communication device.

10. The non-transitory computer readable recording medium as in claim 9,
wherein the computer-readable instructions, when executed by the processor, further cause the first communication device to:
in a case where the specific obtaining method is the second communication, cause the display unit to display second confirmation information for confirming with the user whether a predetermined mark disposed at or near an NFC interface of the different communication device has been found.

11. The non-transitory computer readable recording medium as in claim 1, wherein shift information of the second communication device is obtained together with the specific bootstrapping key of the second communication device, wherein the shift information is information indicating whether a predetermined operation for shifting a state of the second communication device from a non-respondent state to a respondent state is required, the non-respondent state is a state where the second communication device is incapable of sending the authentication response, and the respondent state is a state where the second communication device is capable of sending the authentication response, wherein the computer-readable instructions, when executed by the processor, further cause the first communication device to:

in a case where the shift information indicates that the predetermined operation is required, cause the display unit to display fourth method information indicating the predetermined operation, wherein in a case where the shift information indicates that the predetermined operation is not required, the fourth method information is not displayed.

12. The non-transitory computer readable recording medium as in claim 1, wherein shift information of the second communication device is obtained together with the specific bootstrapping key of the second communication device, wherein the shift information is information indicating whether sending of a predetermined instruction for shifting a state of the second communication device from a non-respondent state to a respondent state is required, the non-respondent state is a state where the second communication device is incapable of sending the authentication response, and the respondent state is a state where the second communication device is capable of sending the authentication response, wherein the computer-readable instructions, when executed by the processor, further cause the first communication device to:

in a case where the shift information indicates that the sending of the predetermined instruction is required, send the predetermined instruction to the second communication device, wherein in a case where the shift information indicates that the sending of the predetermined instruction is not required, the predetermined instruction is not sent.

13. The non-transitory computer readable recording medium as in claim 12, wherein the computer-readable instructions, when executed by the processor, further cause the first communication device to:

in the case where the shift information indicates that the sending of the predetermined instruction is required, cause the display unit to display third confirmation information for confirming with a user whether to send the predetermined instruction, wherein in a case where it is selected that the predetermined instruction is to be sent in a situation where the third confirmation information is displayed, the predetermined instruction is sent to the second communication device, and in a case where it is selected that the predetermined instruction is not to be sent in the situation where the third confirmation information is displayed, the predetermined instruction is not sent.

14. A first communication device comprising:

a Wi-Fi interface configured to execute Wi-Fi communication in conformity with a Wi-Fi standard;

a display unit; and a controller, wherein the controller is configured to:

cause the display unit to display a model name inputting section for accepting an inputting of a model name of a communication device, in a case where a model name is not inputted in a situation where the model name inputting section is displayed, cause the display unit to display first method selection information including M obtaining methods for obtaining a bootstrapping key of a different communication device different from the first communication device, M being an integer of equal to or greater than 2, wherein in a case where a specific model name is inputted in the situation where the model name inputting section is displayed, cause the display unit to display second method selection information, wherein the second method selection information includes N obtaining methods according to a communication device having the specific model name among the M obtaining methods, wherein each of the N obtaining methods is displayed in a selectable manner, and N is an integer of equal to or greater than 1 and less than the M;

accept a selection of a specific obtaining method from among the M obtaining methods included in the first method selection information or the second method selection information;

in a case where the specific obtaining method is selected cause the display unit to display specific support information corresponding to the specific obtaining method among M support information corresponding to the M obtaining methods, each of the M support information being for supporting obtaining of the bootstrapping key of the different communication device by a corresponding obtaining method corresponding to the support information;

after the specific obtaining method has been selected, obtain by the specific obtaining method a specific bootstrapping key which is a bootstrapping key of a second communication device different from the first communication device;

in a case where the specific bootstrapping key is obtained, send an authentication request in which the specific bootstrapping key is used to the second communication device via the Wi-Fi interface;

in a case where the authentication request is sent to the second communication device, receive an authentication response from the second communication device via the Wi-Fi interface; and in a case where the authentication response is received from the second communication device, execute communication of connection information with the second communication device via the Wi-Fi interface, the connection information being for establishing a Wi-Fi connection between the first communication device or the second communication device and an external device.

15. A method performed by a first communication device which comprises:

a Wi-Fi interface configured to execute Wi-Fi communication in conformity with a Wi-Fi standard; and a display unit, the method comprising:

causing the display unit to display a model name inputting section for accepting an inputting of a model name of a communication device, in a case where a model name is not inputted in a situation where the model name inputting section is displayed, causing the display unit to display first method selection information including M obtaining methods for obtaining a bootstrapping key of a different communication device different from the first communication device, M being an integer of equal to or greater than 2, wherein in a case where a specific model name is inputted in the situation where the model name inputting section is displayed, causing the display unit to display second method selection information, wherein the second method selection information includes N obtaining methods according to a communication device having the specific model name among the M obtaining methods, wherein each of the N obtaining methods is displayed in a selectable manner, and N is an integer of equal to or greater than 1 and less than the M;

accepting a selection of a specific obtaining method from among the M obtaining methods included in the first method selection information or the second method selection information;

in a case where the specific obtaining method is selected causing the display unit to display specific support information corresponding to the specific obtaining method among M support information corresponding to the M obtaining methods, each of the M support information being for supporting obtaining of the bootstrapping key of the different communication device by a corresponding obtaining method corresponding to the support information;

after the specific obtaining method has been selected, obtaining by the specific obtaining method a specific bootstrapping key which is a bootstrapping key of a second communication device different from the first communication device;

in a case where the specific bootstrapping key is obtained, sending an authentication request in which the specific bootstrapping key is used to the second communication device via the Wi-Fi interface;

in a case where the authentication request is sent to the second communication device, receiving an authentication response from the second communication device via the Wi-Fi interface; and in a case where the authentication response is received from the second communication device, executing communication of connection information with the second communication device via the Wi-Fi interface, the connection information being for establishing a Wi-Fi connection between the first communication device or the second communication device and an external device.

* * * * *